United States Patent
Lunttila et al.

(10) Patent No.: US 11,452,124 B2
(45) Date of Patent: Sep. 20, 2022

(54) UPLINK CHANNEL SCHEDULING TO RETAIN CHANNEL OCCUPANCY FOR UNLICENSED WIRELESS SPECTRUM

(71) Applicant: NOKIA TECHNOLOGIES OY, Espoo (FI)

(72) Inventors: Timo Lunttila, Espoo (FI); Esa Tiirola, Kempele (FI); Kari Hooli, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/946,598

(22) PCT Filed: Jan. 12, 2018

(86) PCT No.: PCT/FI2018/050022
§ 371 (c)(1),
(2) Date: Jun. 29, 2020

(87) PCT Pub. No.: WO2019/138149
PCT Pub. Date: Jul. 18, 2019

(65) Prior Publication Data
US 2020/0337072 A1    Oct. 22, 2020

(51) Int. Cl.
*H04W 72/12*   (2009.01)
*H04W 16/14*   (2009.01)
(Continued)

(52) U.S. Cl.
CPC ....... *H04W 72/1268* (2013.01); *H04L 5/0012* (2013.01); *H04L 5/0055* (2013.01);
(Continued)

(58) Field of Classification Search
CPC ......... H04W 72/1242; H04W 72/0413; H04W 72/1268; H04W 74/085; H04W 72/0446;
(Continued)

(56) References Cited

U.S. PATENT DOCUMENTS

| 9,439,209 B2 | 9/2016 | Korhonen et al. |
| 11,121,836 B2 * | 9/2021 | Kwak ............... H04W 72/1289 |

(Continued)

FOREIGN PATENT DOCUMENTS

| WO | 2017118627 A1 | 7/2017 |
| WO | 2017165405 A2 | 9/2017 |

OTHER PUBLICATIONS

European Search Report for Application No. 18900519.2, dated Jun. 29, 2021, 14 pages.
(Continued)

*Primary Examiner* — Yee F Lam
(74) *Attorney, Agent, or Firm* — Brake Hughes Bellermann LLP

(57) ABSTRACT

A technique includes receiving, by a user device, a configuration of a set of one or more resources for an uplink channel to be used for transmission by the user device in a slot prior to a short physical uplink control channel of the slot; receiving, by the user device, a downlink control information including a downlink assignment for a downlink channel; identifying, by the user device based on the downlink assignment, a resource of the set of one or more resources for the uplink channel, and a physical uplink control channel; and transmitting, by the user device, a signal via the identified resource for the uplink channel, prior to the short physical uplink control channel of the slot.

21 Claims, 10 Drawing Sheets

(51) Int. Cl.
*H04W 74/08* (2009.01)
*H04L 5/00* (2006.01)

(52) U.S. Cl.
CPC .......... *H04L 5/0094* (2013.01); *H04W 16/14* (2013.01); *H04W 72/1289* (2013.01); *H04W 74/0808* (2013.01)

(58) Field of Classification Search
CPC ..... H04L 5/001; H04L 5/0012; H04L 5/0053; H04L 5/0051; H04L 5/0048
See application file for complete search history.

(56) References Cited

U.S. PATENT DOCUMENTS

| | | | |
|---|---|---|---|
| 2014/0003375 A1* | 1/2014 | Nam | H04L 1/1861 370/329 |
| 2016/0344526 A1 | 11/2016 | Fan et al. | |
| 2017/0163388 A1* | 6/2017 | Wiemann | H04L 1/1854 |
| 2017/0273071 A1* | 9/2017 | Nogami | H04W 72/1242 |
| 2017/0311346 A1* | 10/2017 | Chendamarai Kannan | H04W 16/14 |
| 2018/0048451 A1* | 2/2018 | Yin | H04W 72/0446 |
| 2018/0191547 A1* | 7/2018 | Mukherjee | H04W 72/0446 |
| 2018/0270860 A1* | 9/2018 | Bhorkar | H04W 74/006 |
| 2018/0279296 A1* | 9/2018 | Hosseini | H04L 5/001 |
| 2019/0007175 A1* | 1/2019 | Kwak | H04L 5/0048 |
| 2019/0037561 A1* | 1/2019 | Jung | H04L 1/1854 |
| 2019/0081763 A1* | 3/2019 | Akkarakaran | H04L 1/1607 |
| 2019/0110332 A1* | 4/2019 | Wikstrom | H04W 52/0229 |
| 2019/0165879 A1* | 5/2019 | Wang | H04L 5/0055 |
| 2019/0289586 A1* | 9/2019 | Ouchi | H04L 27/2602 |
| 2019/0342864 A1* | 11/2019 | Hwang | H04L 5/0053 |
| 2019/0349942 A1* | 11/2019 | Li | H04L 1/1819 |
| 2019/0372720 A1* | 12/2019 | Lee | H04L 1/08 |
| 2020/0022174 A1* | 1/2020 | Karaki | H04L 1/1812 |
| 2020/0029354 A1* | 1/2020 | Hwang | H04W 72/044 |
| 2020/0127783 A1* | 4/2020 | Kwak | H04W 72/1273 |
| 2020/0336987 A1* | 10/2020 | Mukherjee | H04W 52/146 |

OTHER PUBLICATIONS

3GPP TSG RAN WG1 Meeting 90bis, R1-1717963; "Considerations on PUCCH Resource Allocation for NR", Agenda Item: 7.3.2.4; Source: LG Electronics; Prague, CZ; Oct. 9-13, 2017; 10 pages.

3GPP TSG RAN WG1 Meeting #90, R1-1713631; "Resource Allocation for PUCCH with HARQ-ACK", Agenda Item: 6.1.3.2.4; Source: Samsung; Prague, Czechia; Aug. 21-25, 2017; 4 pages.

International Search Report and Written Opinion for International Application No. PCT/FI2018/050022, dated Apr. 24, 2018, 12 pages.

Office Action for European Application No. 18900519.2, dated Aug. 1, 2022, 5 pages.

* cited by examiner

UPLINK CHANNEL SCHEDULING TO RETAIN CHANNEL OCCUPANCY FOR UNLICENSED WIRELESS SPECTRUM

CROSS-REFERENCE TO RELATED APPLICATIONS

This application is a national stage entry of International Application No. PCT/FI2018/050022, filed Jan. 12, 2018, entitled "UPLINK CHANNEL SCHEDULING TO RETAIN CHANNEL OCCUPANCY FOR UNLICENSED WIRELESS SPECTRUM" which is hereby incorporated by reference in its entirety.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the Long Term Evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. A goal of 5G is to provide significant improvement in wireless performance, which may include new levels of data rate, latency, reliability, and security. 5G NR may also scale to efficiently connect the massive Internet of Things (IoT), and may offer new types of mission-critical services.

SUMMARY

According to an example implementation, a method includes receiving, by a user device, a configuration of a set of one or more resources for an uplink channel to be used for transmission by the user device in a slot prior to a short physical uplink control channel of the slot; receiving, by the user device, a downlink control information including a downlink assignment for a downlink channel; identifying, by the user device based on the downlink assignment, a resource of the set of one or more resources for the uplink channel, and a physical uplink control channel; and transmitting, by the user device, a signal via the identified resource for the uplink channel, prior to the short physical uplink control channel of the slot.

According to an example implementation, an apparatus includes at least one processor and at least one memory including computer instructions, when executed by the at least one processor, cause the apparatus to: receive, by a user device, a configuration of a set of one or more resources for an uplink channel to be used for transmission by the user device in a slot prior to a short physical uplink control channel of the slot; receive, by the user device, a downlink control information including a downlink assignment for a downlink channel; identify, by the user device based on the downlink assignment, a resource of the set of one or more resources for the uplink channel, and a physical uplink control channel; and transmit, by the user device, a signal via the identified resource for the uplink channel, prior to the short physical uplink control channel of the slot.

According to an example implementation, an apparatus includes means for receiving, by a user device, a configuration of a set of one or more resources for an uplink channel to be used for transmission by the user device in a slot prior to a short physical uplink control channel of the slot; means for receiving, by the user device, a downlink control information including a downlink assignment for a downlink channel; means for identifying, by the user device based on the downlink assignment, a resource of the set of one or more resources for the uplink channel, and a physical uplink control channel; and means for transmitting, by the user device, a signal via the identified resource for the uplink channel, prior to the short physical uplink control channel of the slot.

According to an example implementation, a computer program product includes a computer-readable storage medium and storing executable code that, when executed by at least one data processing apparatus, is configured to cause the at least one data processing apparatus to perform a method including: receiving, by a user device, a configuration of a set of one or more resources for an uplink channel to be used for transmission by the user device in a slot prior to a short physical uplink control channel of the slot; receiving, by the user device, a downlink control information including a downlink assignment for a downlink channel; identifying, by the user device based on the downlink assignment, a resource of the set of one or more resources for the uplink channel, and a physical uplink control channel; and transmitting, by the user device, a signal via the identified resource for the uplink channel, prior to the short physical uplink control channel of the slot.

According to an example implementation, a method includes transmitting, by a base station, a configuration of a set of one or more resources for an uplink channel to be used for transmission by a user device in a slot prior to a short physical uplink control channel of the slot; transmitting, by the base station to the user device, a downlink control information including a downlink assignment for a downlink channel, wherein the downlink assignment indicates a resource of the set of one or more resources for the uplink channel, and a physical uplink control channel; and receiving, by the base station from the user device, a signal via the indicated resource for the uplink channel, prior to the short physical uplink control channel of the slot.

According to an example implementation, an apparatus includes at least one processor and at least one memory including computer instructions, when executed by the at least one processor, cause the apparatus to: transmit, by a base station, a configuration of a set of one or more resources for an uplink channel to be used for transmission by a user device in a slot prior to a short physical uplink control channel of the slot; transmit, by the base station to the user device, a downlink control information including a downlink assignment for a downlink channel, wherein the downlink assignment indicates a resource of the set of one or more resources for the uplink channel, and a physical uplink control channel; and receive, by the base station from the user device, a signal via the indicated resource for the uplink channel, prior to the short physical uplink control channel of the slot.

According to an example implementation, an apparatus includes means for transmitting, by a base station, a configuration of a set of one or more resources for an uplink channel to be used for transmission by a user device in a slot prior to a short physical uplink control channel of the slot; means for transmitting, by the base station to the user device, a downlink control information including a downlink assignment for a downlink channel, wherein the downlink assignment indicates a resource of the set of one or more resources for the uplink channel, and a physical uplink control channel; and means for receiving, by the base station from the user device, a signal via the indicated resource for the uplink channel, prior to the short physical uplink control channel of the slot.

According to an example implementation, a computer program product includes a computer-readable storage medium and storing executable code that, when executed by at least one data processing apparatus, is configured to cause the at least one data processing apparatus to perform a method including: transmitting, by a base station, a configuration of a set of one or more resources for an uplink channel to be used for transmission by a user device in a slot prior to a short physical uplink control channel of the slot; transmitting, by the base station to the user device, a downlink control information including a downlink assignment for a downlink channel, wherein the downlink assignment indicates a resource of the set of one or more resources for the uplink channel, and a physical uplink control channel; and receiving, by the base station from the user device, a signal via the indicated resource for the uplink channel, prior to the short physical uplink control channel of the slot.

The details of one or more examples of implementations are set forth in the accompanying drawings and the description below. Other features will be apparent from the description and drawings, and from the claims.

DETAILED DESCRIPTION

Figure 1:
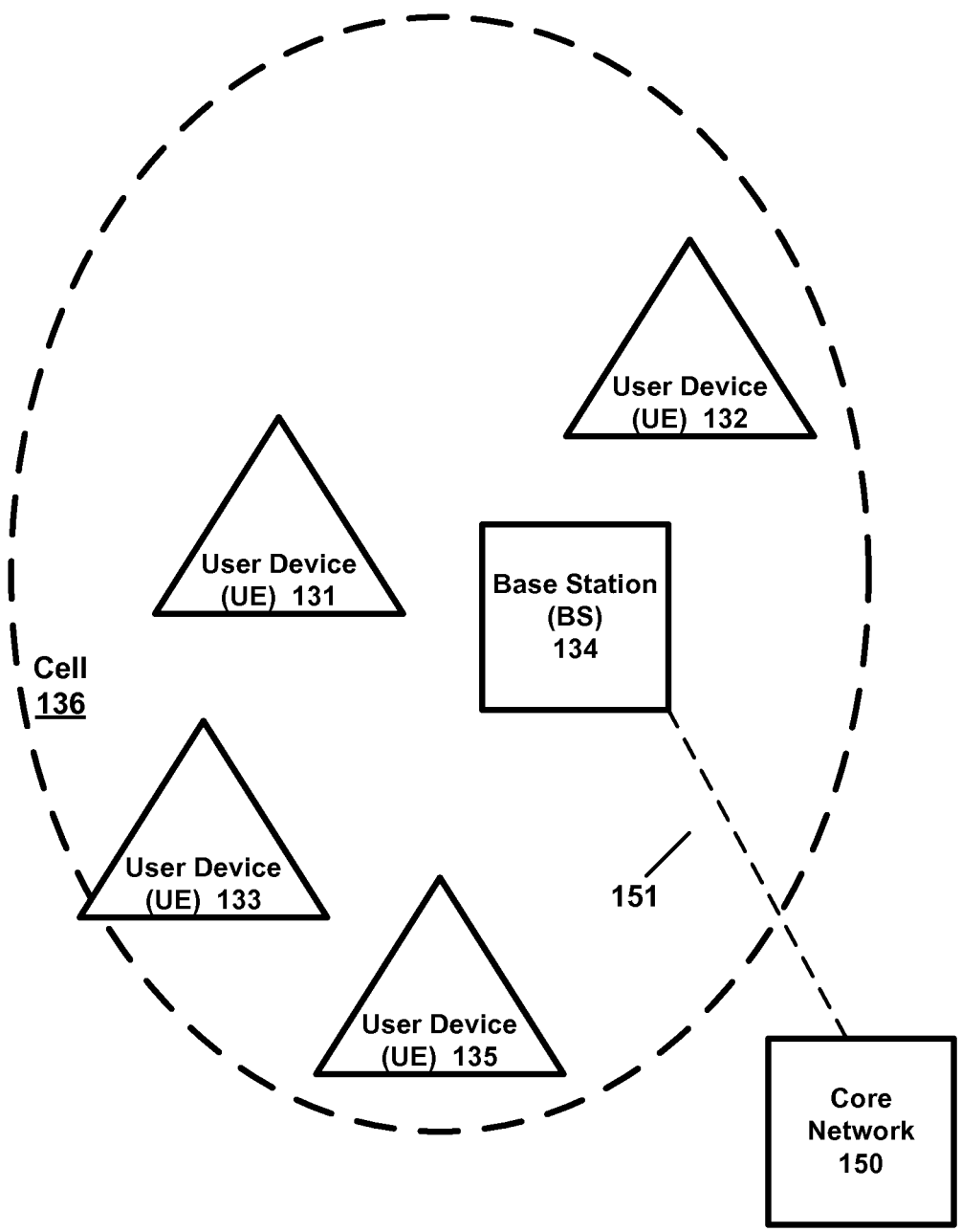
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB, or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE) or mobile station) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans.

Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability, for example, corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability)

The various example implementations may be applied to a wide variety of wireless technologies or wireless networks, such as LTE, LTE-A, 5G, cmWave, and/or mmWave band networks, IoT, MTC, eMTC, eMBB, URLLC, etc., or any other wireless network or wireless technology. These example networks, technologies or data service types are provided only as illustrative examples.

As noted, different data service types (or different types of UEs) may have different performance requirements, such as for reliability (e.g., maximum block error rate), bandwidth or data throughput or minimum data rate, and latency. Some data service types, such as eMBB, may require higher data rates, while tolerating higher block error rates and higher latency (as compared to URLLC). On the other hand, some high reliability data service types, such as URLLC, may require much higher reliability (e.g., lower block error rates) and lower latency, as compared to eMBB. On the other hand, they may operate with relatively small transport blocks sizes (i.e. smaller data throughput) compared to typical eMBB services.

According to an illustrative (and non-limiting) example implementation, a UE may, for example, transmit uplink control information via either a long physical uplink control channel (PUCCH) (also referred to as a long PUCCH format length, or NR PUCCH format 1, 3, or 4) or a short physical uplink control channel (PUCCH) (which may also be referred to as a short PUCCH format length, or NR PUCCH format 0, or 2), e.g., to allow for quicker or more frequent transmission of control information. Thus, in some example cases, a long PUCCH (or long PUCCH format) may be used to allow more data/control information to be sent over a period of time, while a short PUCCH (or short PUCCH format) may be used to allow for a quicker transmission of uplink control information in the case where a shorter latency (e.g., such as for transmission of HARQ feedback) may be required.

Uplink control information (UCI), which may be transmitted via PUCCH, may generally include, for example one or more of: hybrid automatic repeat request (HARQ) feedback, e.g., HARQ Acknowledgement/ACK to acknowledge receipt of data, or HARQ negative acknowledgement/NAK to negatively acknowledge data (e.g., indicate that data was not received); scheduling requests (e.g., which may include a request by a UE for an uplink grant of resources to allow the UE to transmit uplink to the BS); and/or channel state information (CSI feedback, which may include, e.g., a rank indication (RI), a precoder matrix indication (PMI), and/or a channel quality indication (CQI), CSI-RS Resource Indicator (CRI), Strongest Layer Indicator (SLI), as well as L1-RSRP for indicating the beam specific reference signal received power). Also, reference signals, such as demodulation reference signals (DMRS), or sounding reference signals (SRS) may also be transmitted by a UE to a BS, and may be used, for example, by a BS to perform channel estimation and then decode received signals or data from the UE.

According to an example implementation, a New Radio (NR) (5G) frame structure design may be used, e.g., in which both slot and/or mini-slot may be supported. The duration of the slot may be, for example, 14 symbols. But other size slots may also be used, such as 7 symbol slots, or other size slots. Some of the examples herein may use either 7 symbol slots or 14 symbol slots, but these are merely illustrative examples of slot sizes, and other sized slots may be used as well. An illustrative example mini-slot may at least include 1, 2, 3, 4, 7 OFDM (orthogonal frequency division multiplexing) symbols. These are merely some illustrative examples, and other lengths and/or numbers may be used. Generally speaking, mini-slot length may vary between 1 and 13 OFDM symbols, as an illustrative example. Furthermore, aggregation of multiple slots and/or mini-slots may also be used or performed.

Figure 2:
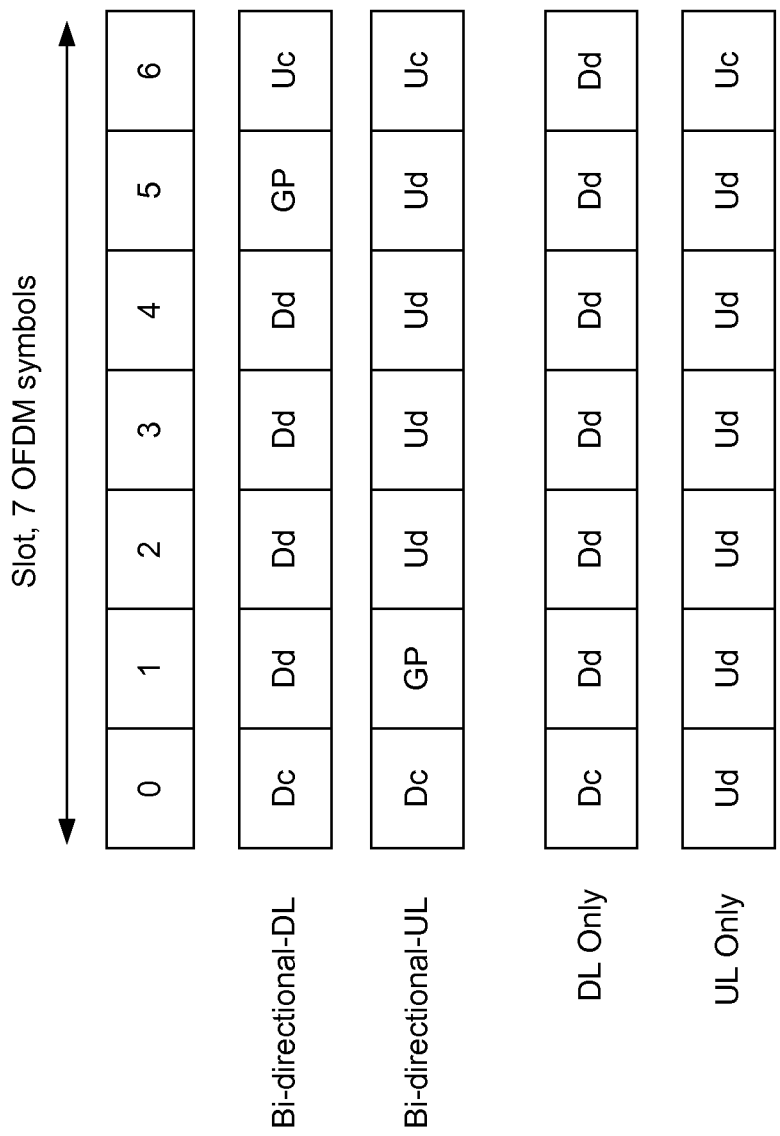
FIG. 2 is a diagram illustrating some slot types according to an example implementation.

FIG. 2 is a diagram illustrating some slot types according to an example implementation. Symbols are shown for each slot type, with Dc referring to downlink control information, Dd referring to downlink data, GP referring to a guard period, Uc referring to uplink control information, and Ud referring to uplink data. For example, there may be several slot types, as shown in FIG. 2, that provide the basic support for both TDD (time division duplexing) and FDD (frequency division duplexing). For the bi-directional slots, there is either downlink data or uplink data transmission in each slot, as well as the corresponding downlink and uplink control. Bi-directional slot may facilitate many TDD functionalities in the NR frame structure, such as, e.g., link direction switching between DL and UL, fully flexible traffic adaptation between DL and UL, and opportunity for low latency, provided that slot length is selected to be short enough. The illustrative example slots of FIG. 2 are shown as 7 symbols, but any slot length may be used. In another example implementation, a slot length of 14 symbols may be used.

In the slots of FIG. 2, multiplexing between DL control, DL/UL data, GP and UL control may be based, for example, primarily on time division multiplexing allowing fast energy efficient pipeline processing of control and data in the receiver. Pipeline processing is facilitated also by so called front loaded DMRS where reference signal is located at the beginning of the data part of the slot. Physical Downlink Control Channel (PDCCH) may be conveyed in the DL control symbol(s) located at the beginning of the slot (or the mini-slot). However, the option of PDCCH and PDSCH multiplexing in frequency domain is not excluded. Additionally, frequency domain multiplexing of long PUCCH (physical uplink control channel) and PUSCH (physical uplink shared channel, which may include data and/or control signals) is supported.

In addition to bi-directional slots, there are also DL-only slot and UL-only slot in FIG. 2. These slot types may be needed at least in FDD mode, but also in certain TDD scenarios to allow longer transmission periods in same direction. These slot types can be seen useful also in the NR unlicensed band scenario.

According to an example implementation, there can be multiple mini-slots in a slot, and different UEs can be scheduled in different mini-slots. Two main scenarios that benefit from mini-slots are latency reduction and unlicensed band operation. Especially, e.g., when 15 kHz subcarrier spacing is used, mini-slot may provide advantages over slot based transmission e.g., in terms of latency. In unlicensed band operation, mini-slots may support more flexible transmission start timing. Furthermore, mini-slots may also be a way to provide time multiplexing between different UEs when operating at high carrier frequencies (with higher subcarrier spacing) and when using RF beamforming architecture. Depending on the system operation point (e.g., offered traffic), the use of a mini-slot for lower air interface latency is useful not only for URLLC, but also for some eMBB applications (e.g. for quickly overcoming slow start TCP/transmission control protocol) procedures.

Figure 3A:
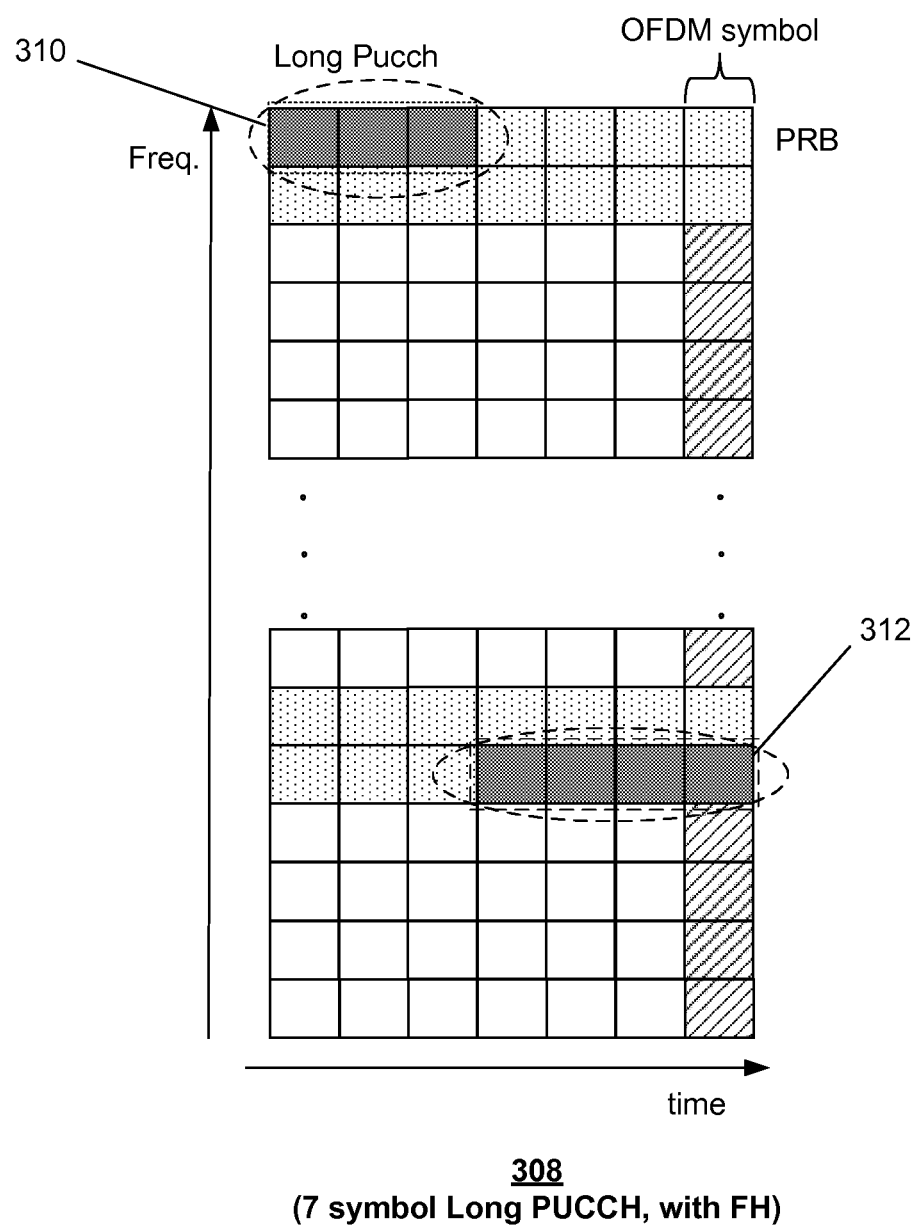
FIG. 3A is a diagram illustrating a long physical uplink control channel (PUCCH) format according to an example implementation.
Figure 3B:
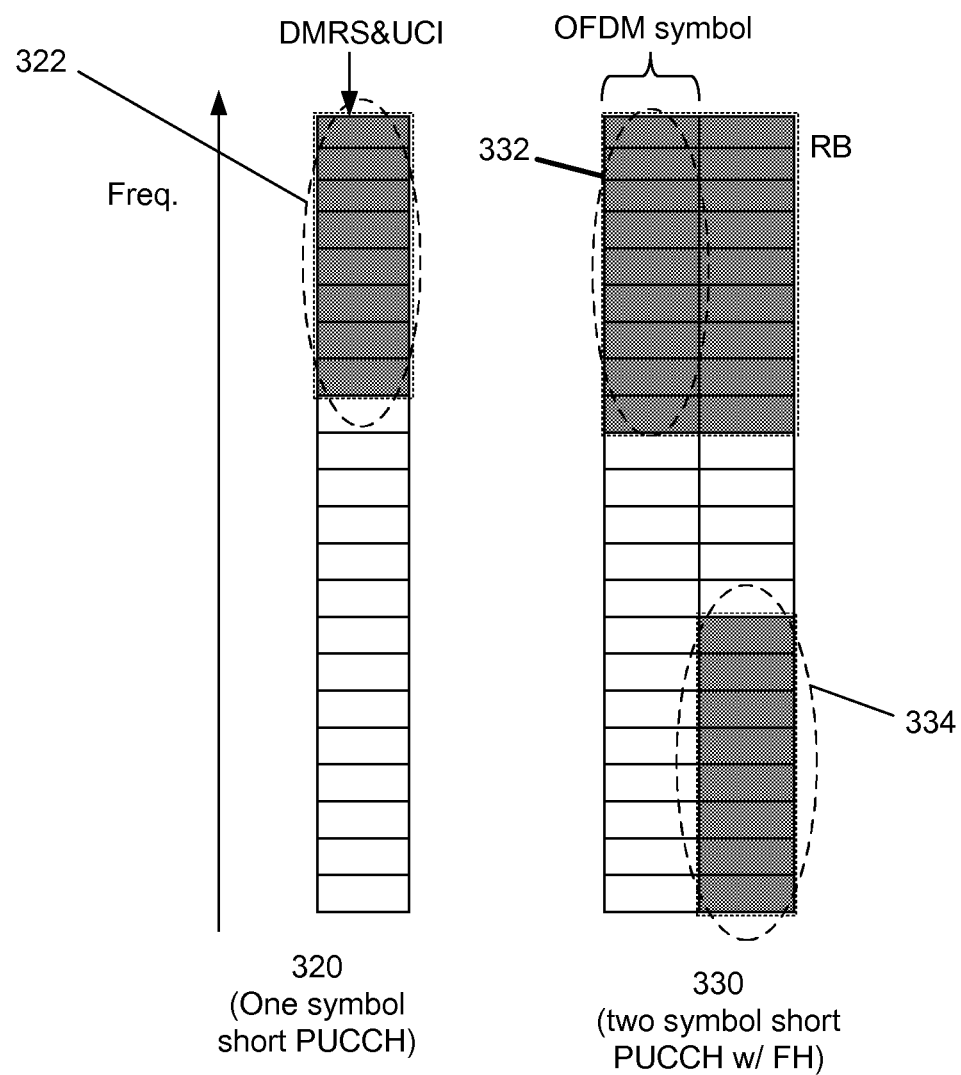
FIG. 3B is a diagram illustrating a short physical uplink control channel (PUCCH) format according to an example implementation, for both one symbol and two symbols.

New Radio (NR), or 5G, may support both a short physical uplink control channel (PUCCH), and a long physical uplink control channel. FIG. 3A is a diagram illustrating a long physical uplink control channel (PUCCH) format according to an example implementation. FIG. 3B is a diagram illustrating a short physical uplink control channel (PUCCH) format according to an example implementation, for both one symbol and two symbols.

Referring to FIG. 3A, an example long PUCCH 308 of 7 symbols (e.g., ≤the length of an example slot or UL portion of the slot) is shown, as an illustrative example. Although a 7 symbol PUCCH is shown in FIG. 3A, other size PUCCH may be used, such as 14 symbol PUCCH. In unlicensed band scenario, long PUCCH and short PUCCH (as well as PUSCH) may be transmitted using interlaced-based resource allocation (i.e., where a transmission spans over a wider band, such as 20 MHz). PUCCH could be transmitted using an interlaced waveform, where PUCCH occupies a number of equidistant (in frequency domain) subcarriers, groups of subcarriers, or physical resource blocks (PRBs). Long PUCCH duration may be from 4 symbols to 14 symbols. Long PUCCH 308 may include, by way of example, a first group 310 of three OFDM symbols of a first physical resource block (RB or PRB, which may include a set of subcarriers), e.g., within the first row, and then a second group 312 of four additional OFDM symbols of a different PRB (e.g., within the ninth row), where each PRB (or physical resource block) may indicate a different frequency or different set of subcarriers, for example. For example, a second symbol of each of the groups 310 and 312 of symbols may include DMRS (e.g., to allow a BS to perform channel estimation and decode received uplink data or information), and the remaining symbols of each group 310 and 312 may include uplink control information such as HARQ feedback, for example. By having a long PUCCH 308 include a group 310 of symbols within a first PRB (the first row) and a group 312 of symbols within another row (e.g., the ninth row), this long PUCCH 308 employs frequency hopping (FH) to provide increased frequency diversity for the long PUCCH format. Frequency diversity on long PUCCH may also be provided based on interlaced transmission. The long PUCCH shown in FIG. 3A may provide a low PAPR/CM (peak to average power ratio or cubic metric), e.g., when using DFT-S-OFDM based waveform.

Referring to FIG. 3B, an example short PUCCH 320 of one symbol is shown, as an illustrative example, and may include a group 322 of PRBs within one OFDM symbol. Similarly, a two symbol short PUCCH 330 may use frequency hopping, and may include a first group 332 of PRBs (physical resource blocks) within a first OFDM symbol, and a second group 334 of PRBs within a second OFDM symbol, for example.

A short PUCCH may be optimized to facilitate low latency and it supports also UL control signaling via bi-directional DL slot, for example, and short PUCCH may also be used to support UL control signaling related to mini-slot PDSCH. Frequency domain multiplexing between RS (reference signals, such as demodulation reference signals) and UCI (uplink control confirmation) is supported. Frequency diversity on short PUCCH may be provided based on frequency hopping, clustered transmission, interlaced transmission, or scheduled transmission, depending on the scenario of interest.

As noted, NR (New Radio/5G) may support two variants of PUCCH, including long PUCCH shown FIG. 3A and short PUCCH shown in FIG. 3B, and multiple formats for both short and long PUCCH. Short PUCCH may be optimized to facilitate low latency and it supports also UL control signaling via bi-directional DL slot. Short PUCCH may occupy, for example, 1 or 2 symbols. Short PUCCH may be used also to support mini-slot PDSCH (e.g., 3 symbol PDSCH).

In LTE LAA (Licensed Assisted Access) and MulteFire, HARQ timing follows n+4 timeline, i.e., HARQ-feedback for DL data (PDSCH) transmitted in subframe n is reported/transmitted in subframe n+4 (or later). In one example, a duration of a transmission opportunity (TXOP), e.g., channel occupancy time (COT) or transmission burst (which may include both UL and DL transmissions), shared by DL and UL may be at most 6 ms to 10 ms, n+4 timeline means that HARQ-ACK for a DL part of a transmission opportunity (TXOP or COT) or transmission burst needs to often be transmitted in a different (subsequent) TXOP or transmission burst. In MulteFire, and possibly other applications, this approach may be impractical, since listen-before talk (LBT) procedure may need to be completed before each TXOP or transmission burst, and in case there are other devices (e.g., WiFi, LAA or MulteFire . . . ) operating in the vicinity, LBT procedure may typically introduce delays to the transmission of HARQ-feedback. Furthermore, this may create additional system complexity (HARQ/scheduling design), as well as implementation complexity (more HARQ processes and memory may be required).

5G/NR allows for much faster UE processing times than LTE LAA and MulteFire. In a self-contained slot, data via PDSCH may be received in a slot, and HARQ-feedback (HARQ ACK/NACK feedback) may be transmitted for such data within the same slot. Also, a transmission opportunity (TXOP) or a channel occupancy time (COT) or a transmission burst may include multiple slots or subframes. Thus, in a self-contained COT or transmission burst, the HARQ-feedback for data received via the one or more slots of the COT or transmission burst is transmitted within such COT or transmission burst (e.g., within or before end of the last slot of the COT or transmission burst, where the COT or transmission burst may include one or more slots). In an example of a self-contained slot, HARQ-ACK feedback for the PDSCH part of a slot may be provided at the end (e.g., last symbol or last few symbols) of the same slot.

In 5G/NR, BS controls the PDSCH scheduling timing, HARQ-ACK timing, and PUSCH scheduling timing by signaling to UE parameters K0, K1, K2, respectively. K0 indicates in slots the time between DL assignment and related PDSCH, K1 indicates in slots the time between PDSCH and related HARQ-ACK transmission, and K2 indicates in slots the time between UL grant and related PUSCH.

Figure 4:
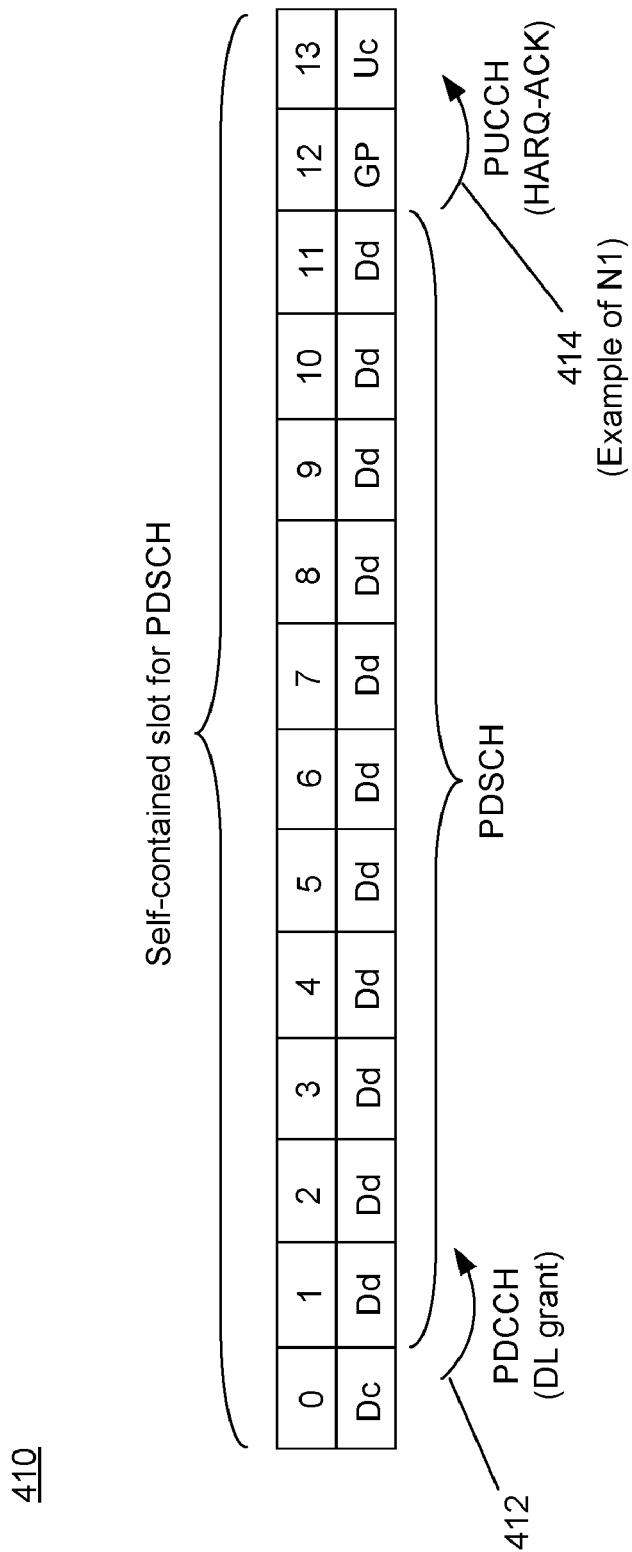
FIG. 4 is a diagram illustrating a self-contained slot for downlink data channel according to an example implementation.

An example self-contained slot is illustrated in FIG. 4. Note that UE's timing advance related to the transmission of uplink part is not shown in FIG. 4. FIG. 4 is a diagram illustrating a self-contained slot for downlink data channel according to an example implementation. A UE reports HARQ-ACK feedback within Uc symbol (symbol 13) for a PDSCH data transmission (Dd of symbols 1-11) during the same slot (for slot 410). Dc denotes DL (downlink) control signals, Dd=DL data, GP=Guard Period, and Uc=UL (uplink) control signals. PDCCH DL assignment (which may also be referred to as a DL grant, shown within Dc of symbol 0 of slot 410) and the related PDSCH (DL data via PDSCH channel on symbols 1-11) are transmitted in the same slot 410. This is signaled with PDSCH Scheduling timing K0=0 (slots). At symbol 0, Dc (downlink control information) includes PDSCH allocation, which is a DL grant or DL allocation of resources for PDSCH channel for transmission of DL data. HARQ-feedback (transmitted via Uc symbol 13 of slot 410 in this example) for the PDSCH allocation is transmitted by UE in the same slot 410 as the PDSCH (DL data, via symbols 1-11 of slot 410) itself. This may be signaled by BS to UE with HARQ-ACK timing K1=0 slots, for example.

Thus, as shown in FIG. 4, at 412, the PDCCH DL grant (or DL assignment) is provided for PDSCH channel (or DL data transmission via Dd symbols 1-11). Also, at 414, a gap is shown between the end of the DL data (Dd) transmission at symbol 11, and the start of transmission of HARQ-feedback via the physical uplink control channel provided via Uc symbol 13. This gap or period of time 414 may also be referred to as N1, described below. It should be noted that due to the timing advance, the gap may typically be shorter than one symbol in practice.

It may be desirable to consider the UE processing time(s) in terms of symbols together with absolute time (e.g., in μs), instead of slots (K1). Parameter N1 denotes the number of OFDM symbols required for UE processing from the end of NR-PDSCH reception to the earliest possible start of the corresponding HARQ-ACK (or HARQ-feedback) transmission from UE perspective. UE may not be expected transmit anything in uplink if the network has set the value of K1 without leaving sufficient time for UE processing. Parameter N2 denotes the number of OFDM symbols required for UE processing from the end of NR-PDCCH containing the UL grant reception to the earliest possible start of the corresponding NR-PUSCH (UL data) transmission from the UE perspective. UE is not expected transmit anything in uplink if the network/BS has set the value of K2 without leaving sufficient time for UE processing.

Table 1 and Table 2 below illustrate some example values for N1 (HARQ feedback timing) and N2 (UE processing time for UL data transmission) for both a baseline case (Table 1), and an aggressive case (Table 2).

TABLE 1

UE Processing Time and HARQ Timing (Capability #1, baseline)

| Config-uration | HARQ Timing Parameter | Units | 15 KHz SCS | 30 KHz SCS | 60 KHz SCS | 120 KHz SCS |
|---|---|---|---|---|---|---|
| Front-loaded DMRS only | N1 | Symbols | [8] | [10] | [14] | [14-21] |
| Front-loaded + additional DMRS | N1 | Symbols | [13] | [13] | [17] | [21] |
| Frequency-first RE-mapping | N2 | Symbols | [9] | [11] | [17] | [31] |

TABLE 2

UE Processing Time and HARQ Timing (Capability #2, aggressive).

| Configuration | HARQ Timing Parameter | Units | 15 KHz SCS | 30 KHz SCS |
|---|---|---|---|---|
| Front-loaded DMRS only | N1 | Symbols | [2.5-4] | [2.5-6] |
| Front-loaded + additional DMRS | N1 | Symbols | [12] | [12] |
| Frequency-first RE-mapping | N2 | Symbols | [2.5-6] | [2.5-6] |

Values for N1 and N2 are shown in Tables 1 and 2, for different configurations [values in brackets are possible values that may be used, as examples]. For example, if DMRS (demodulation reference signals) are located at front or beginning of PDSCH, then the UE can process the DMRS faster (UE can form a channel estimate earlier, e.g., because the UE cannot form the channel estimate before it has received all the pilots/reference signals), as compared when there is additional DMRS toward end of slot. Providing reference signals (e.g., DMRS) near the end or later in a slot may increase UE processing budget accordingly.

Also, for example, a frequency first RE (resource element) mapping may include a configuration where modulation symbols are mapped, by UE, across subcarriers before mapping over consecutive symbols within a slot; Interleaving may not be applied in time domain (i.e., between OFDM symbols of the slot), which means that the UE can process the symbols to be transmitted in a pipeline fashion; instead of creating transmitted signal for entire slot at a time, signals can be mapped to symbols in a pipelined fashion for part of slot.

In an example implementation, a UE that is replying (e.g., with HARQ-feedback) to a DL transmission does not need to perform a listen-before-talk (LBT) (also referred to as a clear channel assessment (CCA) if the silent gap (e.g., a period of time when the UE is neither receiving or transmitting) between the end of the downlink transmission and the start of the uplink transmission of control information (HARQ-feedback) is less than a threshold (e.g., less than 16 microseconds, according to an illustrative example). However, if a silent gap is greater than or equal to the threshold gap (e.g., greater than or equal to 16 microseconds, in this illustrative example), then the UE may typically need to perform LBT/CCA before transmitting the uplink control information (e.g., HARQ-feedback). Also, another disadvantage of allowing a larger silent gap (e.g., greater than or equal to the threshold) is that this may create an opportunity for neighbor user devices to contend for and obtain the channel or wireless media, e.g., via LBT or CCA, which may delay the UE's transmission of its HARQ-feedback until a subsequent slot. For example, a silent gap may arise or be present when a gap or guard period is provided between downlink data transmission (via PDSCH) and uplink control information transmission (e.g., HARQ-feedback via PUCCH) in order to comply with the parameter N1 requirements for HARQ feedback.

Figure 5:
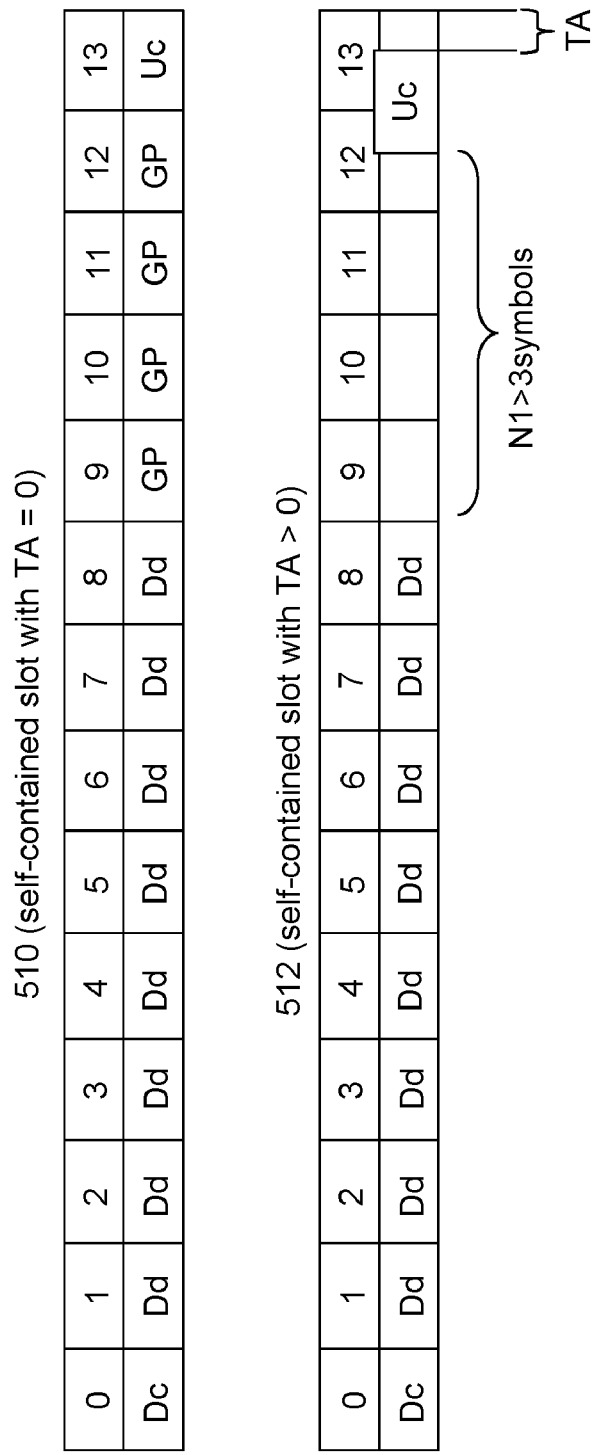
FIG. 5 is a diagram illustrating slots according to example implementations.

FIG. 5 is a diagram illustrating slot examples, e.g., where a gap may cause the UE to perform listen-before-talk (LBT) to confirm that the channel is not occupied before transmitting control information/HARQ-feedback according to an example implementation. The slots of FIG. 5 may provide a self-contained operation for UEs supporting HARQ and Timing Capability #2 (i.e., aggressive) for N1 value 3 (N1=3 symbols). It is based on PDSCH shortening such that the time N1 is sufficient after taking the Timing Advance (TA) into account. In an example implementation, PDSCH shortening in slots 510 and/or 512 (e.g., as compared to slot 410 in FIG. 4) may include a BS puncturing (or not transmitting downlink data or signals) one or more downlink data (Dd) symbols of the PDSCH channel, which frees up or makes available these symbols (e.g., symbols 9, 10, 11) for a guard period (GP), e.g., to increase the silent gap between downlink data transmission and a start of uplink HARQ-feedback transmission at Uc symbol to satisfy the N1 requirements. In example slot 510 of FIG. 5, where the value of Timing Advance (TA) is less than the duration of one symbol (in terms of absolute time), a UE with N1=3 symbols is able to provide HARQ-ACK feedback in during the same slot as where the PDSCH is.

A disadvantage with this approach is increased GP (guard period) overhead as there will be multiple empty symbols (GP) before the start of the UL control information (Uc) for HARQ-feedback, which is an inefficient use of resources. A related issue is that, in a contention-based system, such as unlicensed band, the empty symbols (guard period (GP) or silent gap of symbols 9-12) may allow other wireless nodes (e.g., WiFi, LAA, MulteFire, or NR) operating on unlicensed spectrum and contending for channel access to potentially "jump-in" or obtain the channel (e.g., via contention access) and begin transmitting during any of the GP symbols 9-12. In such a case, e.g., where another UE has obtained the channel (or wireless media) during the guard period or gap of GP symbols 9, 10, 11, 12, etc., this would cause the UL LBT performed by UE (LBT on UL channel performed because such silent gap or GP symbols are greater than a threshold) attempting to transmit Uc (HARQ-feedback) to fail (because media or channel is already occupied) and thus, would prevent HARQ feedback transmission. This in turn would cause significant additional latency to HARQ-ACK feedback, and degradation of the quality of service of the DL and/or UL data transmission.

According to an example implementation, it may be desirable to decrease the silent gap or guard period (GP), while providing sufficient time between the end of the downlink data transmission (Dd) over PDSCH and the start of the transmission of HARQ-feedback via Uc on PUCCH so that parameter N1 is satisfied (e.g., sufficient time between end of downlink data transmission and start of transmission by UE of HARQ-feedback is provided to allow HARQ-feedback to be provided for the data received within the same slot). By shortening the GP or gap (silent gap) between downlink data transmission and transmission of HARQ-feedback (e.g., so that the gap or GP is less than the threshold), this may also allow the UE to transmit HARQ-feedback without first performing LBT, and this may also prevent another node or wireless device from contending for and obtaining access to the channel or wireless media during such gap or GP. It may also be desirable to decrease the number of wasted or unused resources (e.g., such as a group of GP symbols) within a slot or group of slots. Thus, by shortening the silent gap or number of GPs, the amount of unused resources may be decreased, and the UE may prevent another node or wireless device from obtaining the channel during the gap or GP (e.g., based on the gap being less than the threshold).

Figure 6:
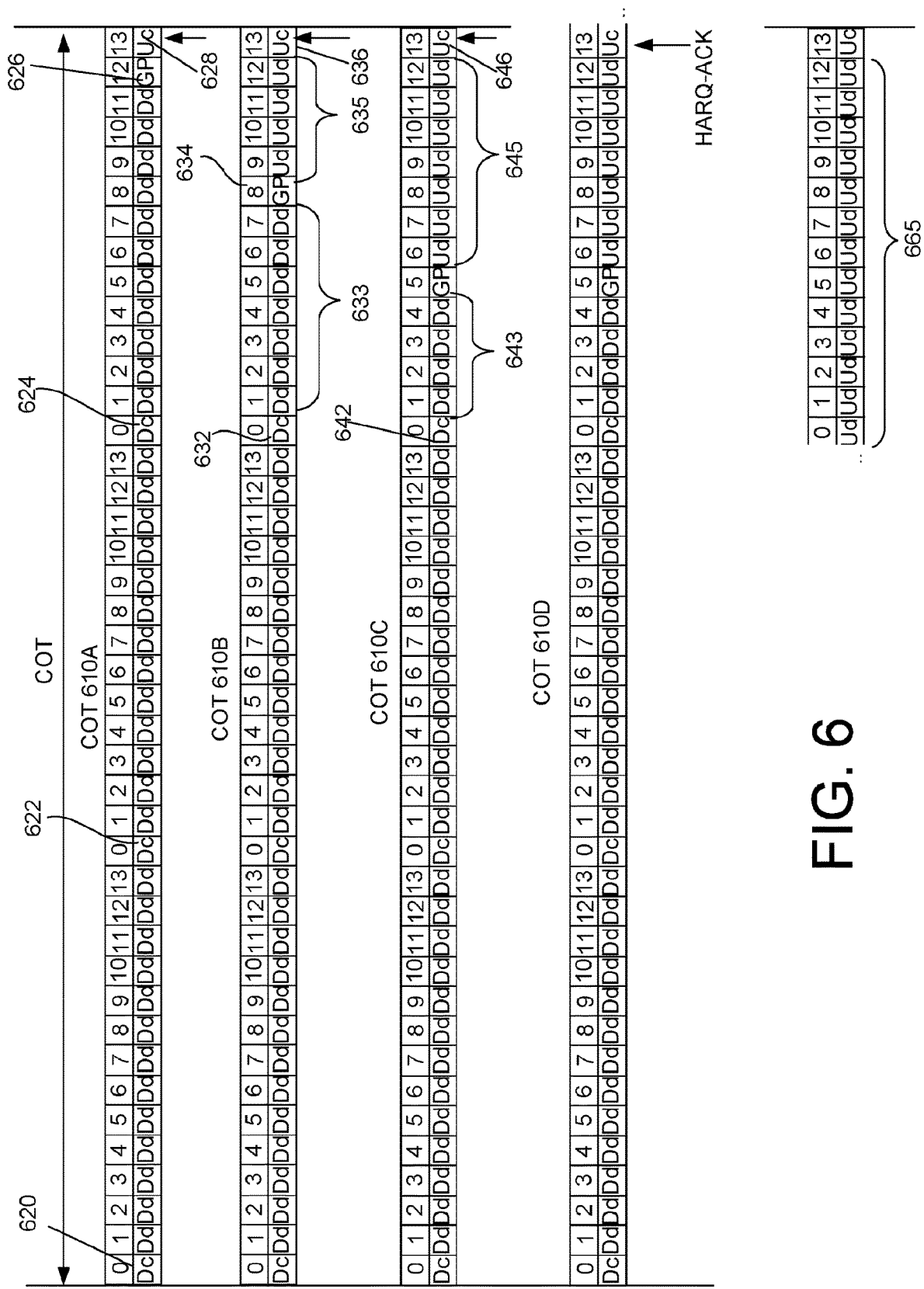
FIG. 6 is a diagram illustrating some channel occupancy times (COTs) that include multiple slots according to various example implementations.

FIG. 6 is a diagram illustrating some channel occupancy times (COTs) or transmission bursts that include multiple slots according to various example implementations. Four example COTs are shown in FIG. 6, including COT 610A, COT 610B, COT 610C and COT 610D.

COT 610A may include 3 slots (each 14 symbols, for example), including: a first slot that begins with Dc symbol 0 at 620 (Dc is part of physical downlink control channel or PDCCH) to provide downlink control information (which may typically include a downlink assignment for this first slot to indicate resources for Dd and other information), followed by 13 Dd (downlink data via PDSCH channel) symbols (symbols 1-13), a second slot that begins with Dc symbol 0 at 622 that is followed by 13 Dd symbols (for downlink data transmission), and third slot that begins with Dc symbol 0 at 624 that is also followed by 13 Dd symbols (Dd symbols 1-13), and then followed by a GP (guard period symbol) 12 at 626, and a Uc (uplink control information) symbol 13 at 628. The Dc symbol at 626 may include HARQ-feedback for the first two slots of this COT 610A (e.g., because the parameter N1 is met for those first two slots of COT 610A). However, the Dc symbol at 626, at the end of the COT and the end of the third slot, cannot communicate HARQ-feedback for the third slot of COT 610A because the parameter N1 is not met for the third slot based on GP symbol at 626. Thus, COT 610A is not a self-contained COT, since HARQ-feedback is not provided within the COT for at least downlink data that is transmitted for at least one (e.g., the last or third) slot of COT 610A.

Also, in this illustrative example, COT 610B may similarly include 3 slots, where the first 2 slots of COT 610B are the same as the first two slots of COT 610A (where each of the first 2 slots includes a Dc symbol for downlink control information for the slot, followed by 13 Dd symbols for the transmission of downlink data via a PDSCH). The third slot of COT 610B includes a Dc symbol 0 at 632, followed by a shortened PDSCH 633 (or shortened downlink data channel 633) on Dd symbols 1-7 (which may be considered to be a PDSCH or DL data mini-slot 633), followed by a GP symbol 634, and then followed by a 4-symbol PUSCH (or UL data) mini-slot 635 on Ud symbols 9-12. Because the GP symbol 634 and the PUSCH (UL data) mini-slot (of 4 symbols) meets (provides sufficient processing time for the DL data to generate and provide HARQ-feedback) the parameter N1 for the data received via the 7-symbol shortened PDSCH (or shortened DL data mini-slot 633), the uplink control information provided via the Uc symbol 636 includes HARQ-feedback for all three slots of COT 610B (including for the third slot that includes the shortened DL data mini-slot 633). Thus, by including fewer GP symbols (e.g., one GP symbol in this example of COT 610B), and by including a shortened DL data mini-slot (or shortened PDSCH channel) for the third slot and using the freed up or available symbols to provide the 4-symbol PUSCH (or UL data) mini-slot, these UL data symbols of mini-slot 635 provide sufficient UE processing time so that parameter N1 is met for the third slot of COT 610B.

Thus, the structure of COT 610B and the structure of the last/third slot of COT 610B provides a more efficient use of resources (e.g., fewer GP symbols), while decreasing the gap (silent gap) between DL data 633 and UL control information (Uc, provided as a short PUCCH) 636, so that the UE may transmit HARQ-feedback via the Uc symbol 636 without performing LBT, and the gap is less than the threshold (e.g., so that another node or wireless device will be unable to access or obtain the wireless channel or media).

For COT 610B, the downlink data (Dd) may be provided via a PDSCH channel; the uplink symbols (e.g., see 635) may be either data provided via PUSCH (physical uplink shared channel) channel, or may be control signals provided via PUCCH (physical uplink control channel) channel. Although, only data symbols are shown in FIG. 6, the uplink symbols 635 may also be uplink control information provided via PUCCH (e.g., a long PUCCH). Thus, either PUSCH channel resources or long PUCCH channel resources may be used at 635 to provide uplink channel resources for an uplink transmission after the downlink data (Dd symbols or shortened PDSCH channel 633) to reduce the silent gap while meeting the N1 parameter for the last/third slot, and provide a more efficient use of resources, to allow the COT 610B and the last slot to be self-contained (HARQ-feedback for data received within the last slot and COT 610B are transmitted within the same slot and COT 610B).

Downlink control information at Dc 632 (of the third slot) of COT 610B may include a downlink assignment, including information indicating (or identifying): 1) a resource(s) for the uplink channel (either long PUCCH or PUSCH) to be used for uplink transmission at 635 after the downlink data transmission, and 2) a resource(s) for a short PUCCH at 636 for the uplink transmission of HARQ-feedback with respect to the downlink data transmission received within the COT 610B (including for data received at 633 of the last slot).

As described in greater detail herein, in an illustrative example, a UE may receive a configuration or pre-configuration (e.g., via a radio resource control (RRC) message) from the BS that identifies a set of one or more resources (e.g., 4 possible resources) for each of: 1) uplink channel (either PUCCH or PUSCH) for UL transmissions, and the 2) short PUCCH for transmission of HARQ-feedback. Then, the downlink assignment included within downlink control information (Dc) 642 may include an ACK/NACK resource indicator (ARI) that identifies both: 1) a short PUCCH resource, of a plurality of short PUCCH resources, for transmission of HARQ-feedback, and 2) a resource of the set of one or more resources for the uplink channel (e.g., either a resource of the PUSCH channel or a resource of a long PUCCH channel).

COT 610B is an illustrative example of an example technique that may be used, and other implementations may be used. Other example implementations are shown in COTs 610C and 610D. COT 610C is the same as COT 610B, but a shortened PDSCH channel includes a 4-symbol DL minislot 643 on Dd symbols 1-4 after Dc (downlink control) symbol 642, and a 7-symbol PUSCH (or UL data) mini-slot 645 on Ud symbols 6-12 just before the Uc (uplink control information) symbol at 646. Thus, COT 610C also provides a self-contained COT and a self-contained last slot within COT 610C based on the shortened PDSCH channel that include a 4-symbol DL mini-slot 643 and the 7-symbol PUSCH (or UL data) mini-slot 645. Thus, for example, the 7-symbol (UL data) mini-slot 645 provides the UE with sufficient processing time so that the UE has sufficient processing time to process the received Dd (DL data) and then generate and transmit HARQ-feedback for such received DL data within the same slot and within the same COT 610C.

COT 610D illustrates another example implementation, e.g., in which the UE may continue with PUSCH transmission at 665 after the transmission of the HARQ-feedback (Uc) via the short PUCCH. In this case, the BS may grant additional UL resources on PUSCH, which may be used by the UE to continue transmitting.

Thus, according to an example implementation, a self contained COT may be provided, including multiple slots, and implicit resource allocation for an uplink channel (e.g., PUSCH or long PUCCH), and taking into account processing times (such as N1 parameter), so that the UE can handle an entire burst of data and generate and send HARQ-feedback for the burst of DL data in same COT without UE performing LBT, and without allowing (or without risking) another UE to obtain media/channel due to a large gap (or GP). As noted, the LBT requirement is an issue for unlicensed spectrum.

Therefore, according to an example implementation, a method may include receiving, by a user device, a configuration of a set of one or more resources for an uplink channel to be used for transmission by the user device in a slot prior to a short physical uplink control channel of the slot; receiving, by the user device, a downlink control information including a downlink assignment for a downlink channel; identifying, by the user device based on the downlink assignment, a resource of the set of one or more resources for the uplink channel, and a physical uplink control channel; and transmitting, by the user device, a signal via the identified resource for the uplink channel, prior to the short physical uplink control channel of the slot.

In an example implementation, the identifying a resource of the set of one or more resources for the uplink channel, and a physical uplink control channel, may include: receiving, by the user device, a ACK/NACK resource indicator (ARI) value that identifies both: 1) a short physical uplink control channel resource, of a plurality of short physical uplink control channel resources, for transmission of hybrid ARQ (HARQ) ACK/NACK feedback, and 2) a resource of the set of one or more resources for the uplink channel.

In an example implementation, the receiving a configuration of a set of one or more resources for an uplink channel may include: receiving, by a user device, a configuration of a set of one or more resources for an uplink channel, wherein the uplink channel includes one or more of a physical uplink shared channel (PUSCH) and a long physical uplink control channel (long PUCCH).

The method may further include receiving, by the user device, at least some data based on the downlink assignment for the downlink channel; and transmitting, by the user device, a hybrid ARQ (HARQ) ACK/NACK feedback via the identified short physical uplink control channel resource. Also, the slot may include a transmission by the user device of hybrid ARQ (HARQ) ACK/NACK feedback with respect to downlink data received, or attempted to be received, by the user device within the same slot.

In an example implementation, the slot includes the downlink control information (Dc, e.g., 632), downlink data (Dd) received by the user device via a shortened downlink data channel (e.g., shortened DL data 633 or DL mini-slot 633) that frees up resources (e.g., symbols) to be used for uplink transmission via the uplink channel (e.g., PUSCH or long PUCCH at 635), an uplink signal transmitted via the identified resource (e.g., 635) of the uplink channel (e.g., PUSCH or long PUCCH) prior to the short physical uplink control channel (Uc 636 of short PUCCH), and the hybrid ARQ (HARQ) ACK/NACK feedback with respect to the downlink data of the slot.

A self-contained COT (containing DL&UL bursts) may be provided, e.g., for unlicensed band operation, where UE is able to transmit all HARQ-ACK bits of the current COT taking into account a predefined UE processing time constraint (e.g. N1). The COT may have a minimum duration of one slot. Also, an implicitly scheduled or DL assignment triggered UL (either PUSCH or long PUCCH) transmission is provided, which will take place in a self-contained bi-directional slot in the symbols preceding a (short) PUCCH transmission.

According to an example implementation, an implicitly scheduled UL transmission may include an UL transmission that is scheduled based on a scheduling of an associated DL assignment. Thus, an implicitly scheduled UL transmission (e.g., either 635 or 645) may include or may refer to a DL assignment triggered UL transmission (e.g., where a DL assignment triggers an associated scheduling of the UL channel). Thus, for an implicitly schedule UL channel, the UL channel (e.g., 635 or 645) is not scheduled explicitly via dedicated UL grant. Instead, for example, a DL signal creating HARQ-ACK (HARQ-feedback) to be transmitted by UE may trigger or cause UL channel reception (by BS) and UL transmission (by UE) based on (expected/scheduled) HARQ-feedback during PUCCH (e.g., at 636 or 646). The length of implicitly scheduled UL channel resources may be determined according to maximum or configured TA and (the maximum) UE processing capabilities (Table 1, Table 2). Also, a shortened PDSCH (e.g., 633 DL mini-slot), GP (e.g., 634), implicitly scheduled UL channel (e.g., 635) and short PUCCH channel (e.g., 636) may all be contained within a single slot. Also, for example, implicitly scheduled UL channel may follow interlace-based transmission. Also, short PUCCH containing HARQ-ACK for the COT may be transmitted according to interlace based transmission.

In an example implementation, one or more UEs (at least those following self-contained COT, and having short PUCCH to transmit for HARQ-feedback) transmit UL signal (s) during time domain resources defined for implicitly scheduled UL channel. There may be no LBT gap between the end of implicitly scheduled UL channel (e.g., end of 635) and short PUCCH (e.g., 636).

In n example implementation, the resource allocation for the UL transmission may be derived depending on the short PUCCH resource: In one embodiment, the resources for PUSCH (or long PUCCH, or both) are RRC configured upon configuring the ARI (ACK/NACK Resource Indicator) for (short) PUCCH. gNB/BS configures e.g. a set of four resources for short PUCCH, and PUSCH (or long PUCCH, or both PUSCH/long PUCCH) resource pairs. The configuration includes the time and frequency domain resources (e.g. resource block allocation, starting and ending symbol, etc.). For PUSCH the configuration includes also MCS indication. For long PUCCH the configuration may include also code domain resources (e.g. cyclic shift or OCC index). The UE utilizes implicit scheduled PUSCH for UL data transmission. In one embodiment, the UE decides the NDI and HARQ process ID by itself and includes those in the UL transmission. Alternatively, new data is always transmitted (if in buffer) and HARQ process ID is determined based on ARI or based on slot number (according to a predefined rule). ARI in the DL DCI indicates which of the four resource pairs to use. In one embodiment, in absence of UL data (UL-SCH) the UE chooses to use long PUCCH as the UL channel; otherwise the UE uses PUSCH as the UL channel that is implicitly scheduled.

In another example implementation, dynamic scheduling of PUSCH can be used to override the implicitly scheduled UL allocation. Dynamically scheduled PUSCH may be scheduled on the same symbols as the implicitly scheduled UL allocation or on a slot after short PUCCH but within the COT. In the case that the scheduled PUSCH is located in a slot after short PUCCH, the HARQ-ACK may also be transmitted on PUSCH instead of/in addition to short PUCCH (this includes also HARQ). If HARQ-ACK is transmitted both on PUSCH and short PUCCH, UE does not drop implicitly scheduled UL or short PUCCH transmission. If HARQ-ACK is transmitted only on PUSCH, UE drops implicitly scheduled UL and short PUCCH transmission and performs LBT immediately before PUSCH. Selection between these cases may depend on indication whether or not UE performs LBT immediately before PUSCH.

If the UE has data in its buffer (which is usually the case when there is DL activity), the UE may send that data on the PUSCH resources. In absence of data, (as an alternative to transmitting long PUCCH) the UE may transmit, e.g., an empty buffer status report (BSR), or an aperiodic CSI (channel state information) report if so configured. Additionally, e.g., DMRS (demodulation reference signals) and SRS (sounding reference signals) and padding bits may be included into the UL transmission.

According to an example implementation, a UE may perform a number of functions or operations, such as one or more of the following:

1) Receiving, from a BS/gNodeB, a pre-configuration of resources for one or multiple Uplink channels to be transmitted in a self-contained slot prior to short PUCCH. The resource pre-configuration may be given with RRC signaling. The Uplink channel can be PUSCH or long PUCCH. The resource configuration may include resources for PUSCH, long PUCCH, or both. For both PUSCH and long PUCCH, the resource configuration also includes the time and frequency domain resources (e.g. resource block allocation, starting and ending symbol, etc. For PUSCH, the configuration also includes the modulation and the coding scheme. For long PUCCH, the configuration may include also format (e.g., PUCCH format 3 or 4), frequency hopping configuration, DMRS cyclic shift, and pre-DFT OCC length and index.

2) Receiving a DL assignment for PDCSH including an ARI, and determining that HARQ-ACK should be transmitted in the same slot. HARQ-ACK may be transmitted on short PUCCH at the end of the slot. The ARI (ACK/NACK Resource Indicator), indicates which of the (e.g. four) pre-configured short PUCCH resources to use 3) Determining, that UL channel should be transmitted prior to short PUCCH. This may also include determining whether to transmit PUSCH or long PUCCH. If the UL channel is PUSCH, in addition to UL-SCH data the UE may also transmit to the gNB an indication of HARQ-process ID, as well as a New Data Indicator (NDI). In alternative variant, a HARQ process ID may be associated (predetermined or configured) to each ARI value. UE selects the HARQ process ID based on the signaled ARI value. In another alternative variant, UE selects the HARQ process ID based on the slot number, e.g. HARQ ID=(slot number) mod (maximum number of HARQ processes). In one variant, if the UE has UL-SCH data to transmit, it may transmit PUSCH; if not, it shall transmit long PUCCH.

4) Determining, based on the received ARI (and the resource pre-configuration in the first step) the resources for the UL channel.

5) Transmitting on the UL channel, followed by short PUCCH on the determined resources. If transmission starts within 16 us (the threshold time period) after the DL signal, no LBT is required. Otherwise UE may perform single shot (25 us) LBT to confirm that the channel is not occupied by another node or wireless device.

Table 3 below illustrates some example resources that may be identified by each different ARI value, for example. Thus, each ARI value may indicate (or may be associated with) a resource for each of the following: a short PUCCH resource (e.g., for HARQ-feedback), a PUSCH resource (for UL channel) and/or a long PUCCH resource.

TABLE 3

An example of the resource pre-configuration. Four sets of short
PUCCH (for HARQ-feedback), PUSCH and long PUCCH resources
are configured, each associated with a combination of ARI bits.

| ARI bits | short PUCCH | PUSCH | long PUCCH |
|---|---|---|---|
| 00 | sPUCCH resource #0 | PUSCH resource #0 | Long PUCCH resource #0 |
| 01 | sPUCCH resource #1 | PUSCH resource #1 | Long PUCCH resource #1 |
| 10 | sPUCCH resource #2 | PUSCH resource #2 | Long PUCCH resource #2 |
| 11 | sPUCCH resource #3 | PUSCH resource #3 | Long PUCCH resource #3 |

An ARI value may be communicated within downlink control information (e.g., as part of a downlink assignment) to specify one of the four possible ARI values, and thus, identify one of 4 possible short PUCCH resources, one of 4 possible PUSCH resources, and one of 4 possible long PUCCH resources.

Figure 7:
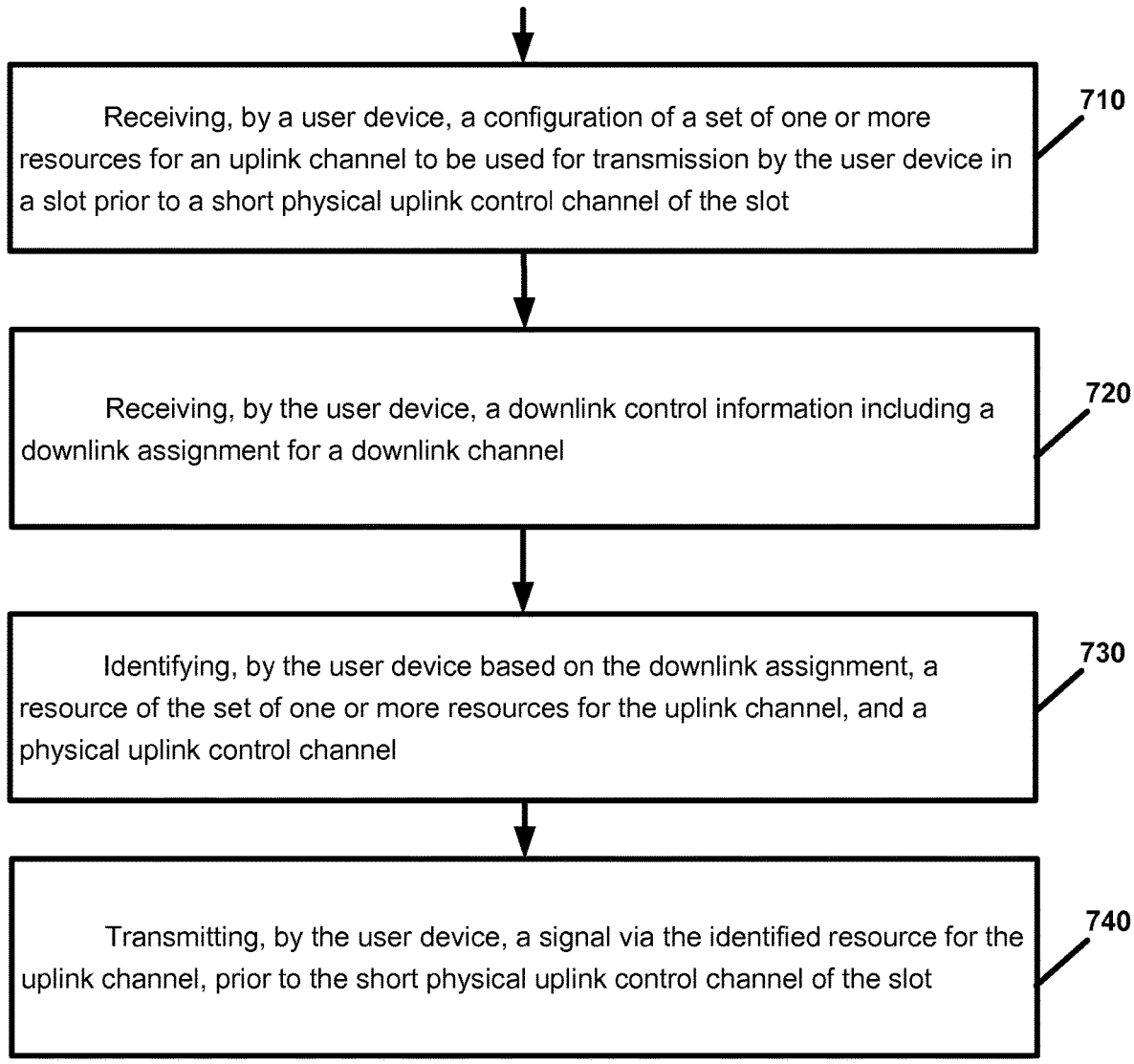
FIG. 7 is a flow chart illustrating operation of a user device (or UE) according to an example implementation.

Example 1. FIG. 7 is a flow chart illustrating operation of a user device according to an example implementation. Operation 710 includes receiving, by a user device, a configuration of a set of one or more resources for an uplink channel to be used for transmission by the user device in a slot prior to a short physical uplink control channel of the slot. Operation 720 includes receiving, by the user device, a downlink control information including a downlink assignment for a downlink channel Operation 730 includes identifying, by the user device based on the downlink assignment, a resource of the set of one or more resources for the uplink channel, and a physical uplink control channel. Operation 740 includes transmitting, by the user device, a signal via the identified resource for the uplink channel, prior to the short physical uplink control channel of the slot.

Example 2. According to an example implementation of the method of examples 1, wherein the identifying, by the user device, based on the downlink assignment, a resource of the set of one or more resources for the uplink channel, and a physical uplink control channel, comprises: receiving, by the user device, a ACK/NACK resource indicator (ARI) value that identifies both: 1) a short physical uplink control channel resource, of a plurality of short physical uplink control channel resources, for transmission of hybrid ARQ (HARQ) ACK/NACK feedback, and 2) a resource of the set of one or more resources for the uplink channel.

Example 3. According to an example implementation of the method of any of examples 1-2, wherein the ACK/NACK resource indicator (ARI) value is one ARI value of a plurality of ARI values, wherein each ARI value of the plurality of ARI values identifies, or is associated with, a different or associated: 1) a short physical uplink control channel (short PUCCH) resource, of a plurality of short physical uplink control channel resources, for transmission of hybrid ARQ (HARM) ACK/NACK feedback, and 2) a resource of the set of one or more resources for the uplink channel.

Example 4. According to an example implementation of the method of any of examples 1-3, wherein the receiving, by a user device, a configuration of a set of one or more resources for an uplink channel comprises: receiving, by a user device, a configuration of a set of one or more resources for an uplink channel, wherein the uplink channel includes one or more of a physical uplink shared channel (PUSCH) and a long physical uplink control channel (long PUCCH).

Example 5. According to an example implementation of the method of any of examples 1-4, wherein the receiving, by a user device, a configuration of a set of resources for an uplink channel comprises: receiving, by a user device, a configuration of a set of one or more resources for an uplink channel, the configuration including one or more of the following for one or more resources: an identification of the resource; a modulation rate and coding scheme (MCS) to be used for transmission via the resource; a channel format; a starting symbol; a duration; a frequency hopping configuration; and a demodulation reference signal cyclic shift.

Example 6. According to an example implementation of the method of any of examples 1-5, wherein the transmitting comprises: determining, by the user device, that a signal should be transmitted via the identified resource of the uplink channel in the slot prior to the short physical uplink control channel of the slot; and transmitting, by the user device, a signal via the identified resource of the uplink channel, before the short physical uplink control channel resource of the slot.

Example 7. According to an example implementation of the method of any of examples 1-6, wherein the transmitting the signal via the uplink channel prior to the short physical uplink control channel reserves the uplink channel for the user device by preventing a gap in transmission by the user device that is greater than a threshold.

Example 8. According to an example implementation of the method of any of examples 1-7, and further comprising: receiving, by the user device, at least some data based on the downlink assignment for the downlink channel; and transmitting, by the user device, a hybrid ARQ (HARQ) ACK/NACK feedback via the identified short physical uplink control channel resource.

Example 9. According to an example implementation of the method of any of examples 1-8 wherein, the slot includes a transmission by the user device of hybrid ARQ (HARQ) ACK/NACK feedback with respect to downlink data received, or attempted to be received, by the user device within the same slot.

Example 10. According to an example implementation of the method of any of examples 1-9, the slot includes a transmission by the user device of hybrid ARQ (HARQ) ACK/NACK feedback with respect to downlink data received, or attempted to be received, by the user device within the same slot and one or more preceding slots in a burst of contiguous downlink transmission.

Example 11. According to an example implementation of the method of any of examples 1-10, wherein the slot comprises the downlink control information, downlink data received by the user device via a shortened downlink data channel that frees up resources to be used for uplink transmission via the uplink channel, an uplink signal transmitted via the identified resource of the uplink channel prior to the short physical uplink control channel, and the hybrid ARQ (HARQ) ACK/NACK feedback with respect to the downlink data of the slot.

Example 12. According to an example implementation of the method of any of examples 1-11, wherein the transmitting, by the user device, a signal via the identified resource of the uplink channel comprises: transmitting, by the user device, a signal via the identified resource of the uplink channel, including uplink data and at least one of a hybrid ARQ (HARQ) process identifier and a new data indicator associated with the uplink data.

Example 13. According to an example implementation of the method of example 12, the hybrid ARQ (HARQ) process identifier is associated with the ACK/NACK resource indicator (ARI) value.

Example 14. According to an example implementation of the method of example 12, wherein the hybrid ARQ (HARQ) process identifier is selected based on a slot number for the slot.

Example 15. According to an example implementation of the method of any of examples 1-14, wherein the transmitting, by the user device, a signal via the identified resource of the uplink channel comprises: determining, by the user device, that uplink transmission via the identified resource of the uplink channel is scheduled to begin less than a threshold time period after end of receipt of the downlink data that is received within the slot based on the downlink assignment for the downlink channel; and transmitting, by the user device, without performing a listen-before-talk of the uplink channel, a signal via the identified resource of the uplink channel, prior to the physical uplink control channel of the self-contained slot.

Example 16. According to an example implementation of the method of any of examples 1-15, wherein the transmitting, by the user device, a signal via the identified resource of the uplink channel comprises: determining, by the user device, that uplink transmission via the identified resource of the uplink channel is scheduled to begin greater than or equal to a threshold time period after end of receipt of the downlink data that is received within the slot based on the downlink assignment for the downlink channel; performing a listen-before-talk of the uplink channel to confirm that the channel is available; and, transmitting, by the user device, a signal via the identified resource of the uplink channel, prior to the physical uplink control channel of the self-contained slot.

Example 17. According to an example implementation of the method of any of examples 1-16, wherein the transmitting a signal via the identified resource for the uplink channel comprises at least one of the following: transmitting physical uplink shared channel (PUSCH) data via a PUSCH channel; transmitting uplink control information via a long physical uplink control channel (long PUCCH); and transmitting at least one of reference signals and channel state information via the long PUCCH channel.

Example 18. An apparatus comprising means for performing a method of any of examples 1-17.

Example 19. An apparatus comprising at least one processor and at least one memory including computer instructions that, when executed by the at least one processor, cause the apparatus to perform a method of any of examples 1-17.

Example 20. An apparatus comprising a computer program product including a non-transitory computer-readable storage medium and storing executable code that, when executed by at least one data processing apparatus, is configured to cause the at least one data processing apparatus to perform a method of any of examples 1-17.

Example 21. An apparatus comprising at least one processor and at least one memory including computer instructions that, when executed by the at least one processor, cause the apparatus to: receive, by a user device, a configuration of a set of one or more resources for an uplink channel to be used for transmission by the user device in a slot prior to a short physical uplink control channel of the slot; receive, by the user device, a downlink control information including a downlink assignment for a downlink channel; identify, by the user device based on the downlink assignment, a resource of the set of one or more resources for the uplink channel, and a physical uplink control channel; and transmit, by the user device, a signal via the identified resource for the uplink channel, prior to the short physical uplink control channel of the slot.

Example 22. The apparatus of example 21 wherein the apparatus being configured to identify, by the user device, based on the downlink assignment, a resource of the set of one or more resources for the uplink channel, and a physical uplink control channel, comprises the apparatus being configured to: receive, by the user device, a ACK/NACK resource indicator (ARI) value that identifies both: 1) a short physical uplink control channel resource, of a plurality of short physical uplink control channel resources, for transmission of hybrid ARQ (HARQ) ACK/NACK feedback, and 2) a resource of the set of one or more resources for the uplink channel.

Example 23. The apparatus of claim 22 wherein the ACK/NACK resource indicator (ARI) value is one ARI value of a plurality of ARI values, wherein each ARI value of the plurality of ARI values identifies, or is associated with, a different or associated: 1) a short physical uplink control channel (short PUCCH) resource, of a plurality of short physical uplink control channel resources, for transmission of hybrid ARQ (HARQ) ACK/NACK feedback, and 2) a resource of the set of one or more resources for the uplink channel.

Example 24. The apparatus of any of examples 21-23 wherein the apparatus being configured to receive, by a user device, a configuration of a set of one or more resources for an uplink channel comprises the apparatus being configured to: receive, by a user device, a configuration of a set of one or more resources for an uplink channel, wherein the uplink channel includes one or more of a physical uplink shared channel (PUSCH) and a long physical uplink control channel (long PUCCH).

Example 25. The apparatus of any of examples 21-24 wherein the apparatus being configured to receive, by a user device, a configuration of a set of resources for an uplink channel comprises the apparatus being configured to: receive, by a user device, a configuration of a set of one or more resources for an uplink channel, the configuration including one or more of the following for one or more resources: an identification of the resource; a modulation rate and coding scheme (MCS) to be used for transmission via the resource; a channel format; a starting symbol; a duration; a frequency hopping configuration; and a demodulation reference signal cyclic shift.

Example 26. The apparatus of any of examples 21-25 wherein the apparatus being configured to transmit comprises the apparatus being configured to: determine, by the user device, that a signal should be transmitted via the identified resource of the uplink channel in the slot prior to the short physical uplink control channel of the slot; and transmit, by the user device, a signal via the identified resource of the uplink channel, before the short physical uplink control channel resource of the slot.

Example 27. The apparatus of any of examples 21-26 wherein the apparatus being configured to transmit the signal via the uplink channel prior to the short physical uplink control channel comprises the apparatus being configured to reserve the uplink channel for the user device by preventing a gap in transmission by the user device that is greater than a threshold.

Example 28. The apparatus of any of examples 21-27 wherein the apparatus is further configured to: receive, by the user device, at least some data based on the downlink assignment for the downlink channel; and transmit, by the user device, a hybrid ARQ (HARQ) ACK/NACK feedback via the identified short physical uplink control channel resource.

Example 29. The apparatus of any of examples 21-28, wherein the slot includes a transmission by the user device of hybrid ARQ (HARQ) ACK/NACK feedback with respect to downlink data received, or attempted to be received, by the user device within the same slot.

Example 30. The apparatus of any of examples 21-29, wherein the slot includes a transmission by the user device of hybrid ARQ (HARQ) ACK/NACK feedback with respect to downlink data received, or attempted to be received, by the user device within the same slot and one or more preceding slots in a burst of contiguous downlink transmission.

Example 31. The apparatus of any of examples 21-30, wherein the slot comprises the downlink control information, downlink data received by the user device via a shortened downlink data channel that frees up resources to be used for uplink transmission via the uplink channel, an uplink signal transmitted via the identified resource of the uplink channel prior to the short physical uplink control channel, and the hybrid ARQ (HARQ) ACK/NACK feedback with respect to the downlink data of the slot.

Example 32. The apparatus of any of examples 21-31, wherein the apparatus being configured to transmit, by the user device, a signal via the identified resource of the uplink channel comprises the apparatus being configured to: transmit, by the user device, a signal via the identified resource of the uplink channel, including uplink data and at least one of a hybrid ARQ (HARQ) process identifier and a new data indicator associated with the uplink data.

Example 33. The apparatus of example 32, wherein the hybrid ARQ (HARQ) process identifier is associated with the ACK/NACK resource indicator (ARI) value.

Example 34. The apparatus of example 32, wherein the hybrid ARQ (HARQ) process identifier is selected based on a slot number for the slot.

Example 35. The apparatus of any of examples 21-34, wherein the apparatus being configured to transmit, by the user device, a signal via the identified resource of the uplink channel comprises the apparatus being configured to: determine, by the user device, that uplink transmission via the identified resource of the uplink channel is scheduled to begin less than a threshold time period after end of receipt of the downlink data that is received within the slot based on the downlink assignment for the downlink channel; and transmit, by the user device, without performing a listen-before-talk of the uplink channel, a signal via the identified resource of the uplink channel, prior to the physical uplink control channel of the self-contained slot.

Example 36. The apparatus of any of examples 21-35, wherein the apparatus being configured to transmit, by the user device, a signal via the identified resource of the uplink channel comprises the apparatus being configured to: determine, by the user device, that uplink transmission via the identified resource of the uplink channel is scheduled to begin greater than or equal to a threshold time period after end of receipt of the downlink data that is received within the slot based on the downlink assignment for the downlink channel; perform a listen-before-talk of the uplink channel to confirm that the channel is available; and transmit, by the user device, a signal via the identified resource of the uplink channel, prior to the physical uplink control channel of the self-contained slot.

Example 37. The apparatus of any of examples 21-36, wherein the apparatus being configured to transmit, by the user device, a signal via the identified resource of the uplink channel comprises the apparatus being configured to perform at least one of the following: transmit physical uplink shared channel (PUSCH) data via a PUSCH channel; transmit uplink control information via a long physical uplink control channel (long PUCCH); and transmit at least one of reference signals and channel state information via the long PUCCH channel.

Figure 8:
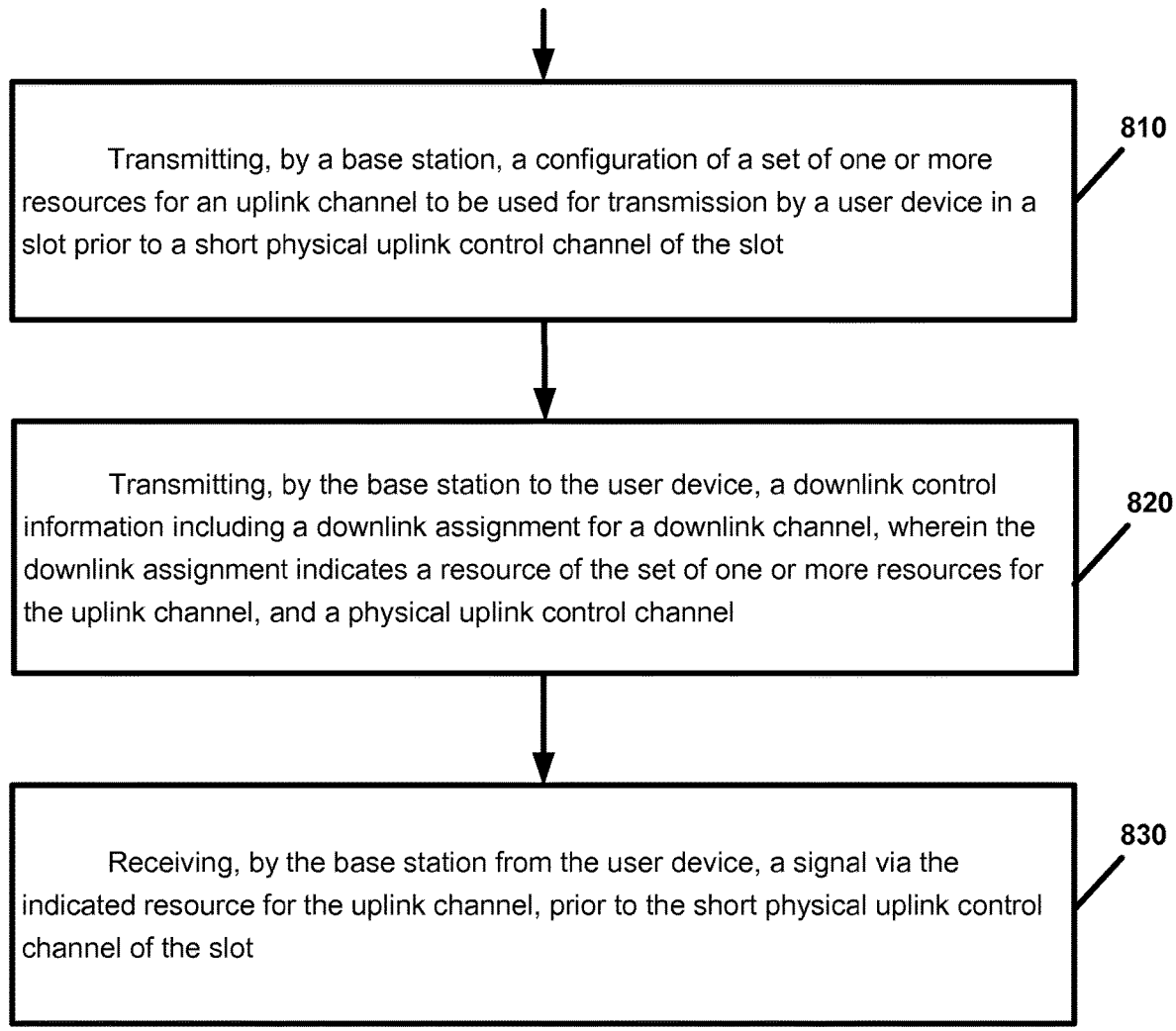
FIG. 8 is a flow chart illustrating operation of a base station (BS) according to an example implementation.

Example 38. FIG. 8 is a flow chart illustrating operation of a base station according to an example implementation. Operation 810 includes transmitting, by a base station, a configuration of a set of one or more resources for an uplink channel to be used for transmission by a user device in a slot prior to a short physical uplink control channel of the slot. Operation 820 includes transmitting, by the base station to the user device, a downlink control information including a downlink assignment for a downlink channel, wherein the downlink assignment indicates a resource of the set of one or more resources for the uplink channel, and a physical uplink control channel. And, operation 830 includes receiving, by the base station from the user device, a signal via the indicated resource for the uplink channel, prior to the short physical uplink control channel of the slot.

Example 39. According to an example implementation of the method of example 38, wherein the downlink assignment comprises: an ACK/NACK resource indicator (ARI) value that identifies both: 1) a short physical uplink control channel resource, of a plurality of short physical uplink control channel resources, for transmission of hybrid ARQ (HARQ) ACK/NACK feedback, and 2) a resource of the set of one or more resources for the uplink channel.

Example 40. According to an example implementation of the method of any of examples 38-39, wherein the transmitting, by a base station, a configuration of a set of one or more resources for an uplink channel comprises transmitting, by the base station, a configuration of a set of one or more resources for an uplink channel, wherein the uplink channel includes one or more of a physical uplink shared channel (PUSCH) and a long physical uplink control channel (long PUCCH).

Example 41. According to an example implementation of the method of any of examples 38-40, wherein the transmitting, by a base station, a configuration of a set of one or more resources for an uplink channel comprises: transmitting, by the base station, a configuration of a set of one or more resources for an uplink channel, the configuration including one or more of the following for one or more resources: an identification of the resource; a modulation rate and coding scheme (MCS) to be used for transmission via the resource; a channel format; a starting symbol; a duration; a frequency hopping configuration; and a demodulation reference signal cyclic shift.

Example 42. According to an example implementation of the method of any of examples 38-41, wherein the slot comprises the downlink control information, downlink data transmitted by the base station via a shortened downlink data channel that frees up resources to be used for uplink transmission via the uplink channel by the user device, an uplink signal received by the base station via the indicated resource of the uplink channel prior to the short physical uplink control channel, and the hybrid ARQ (HARQ) ACK/NACK feedback with respect to the downlink data of the slot.

Example 43. According to an example implementation of the method of any of examples 38-42, wherein the receiving, by the base station from the user device, a signal via the indicated resource for the uplink channel comprises: receiving, by the base station from the user device, a signal via the indicated resource of the uplink channel, including uplink data and at least one of a hybrid ARQ (HARQ) process identifier and a new data indicator associated with the uplink data.

Example 44. According to an example implementation of the method of any of examples 38-43, wherein the hybrid ARQ (HARQ) process identifier is associated with the ACK/NACK resource indicator (ARI) value.

Example 45. An apparatus comprising means for performing a method of any of examples 38-44.

Example 46. An apparatus comprising at least one processor and at least one memory including computer instructions that, when executed by the at least one processor, cause the apparatus to perform a method of any of examples 38-44.

Example 47. An apparatus comprising a computer program product including a non-transitory computer-readable storage medium and storing executable code that, when executed by at least one data processing apparatus, is configured to cause the at least one data processing apparatus to perform a method of any of examples 38-44.

Example 48. An apparatus comprising at least one processor and at least one memory including computer instructions that, when executed by the at least one processor, cause the apparatus to: transmit, by a base station, a configuration of a set of one or more resources for an uplink channel to be used for transmission by a user device in a slot prior to a short physical uplink control channel of the slot; transmit, by the base station to the user device, a downlink control information including a downlink assignment for a downlink channel, wherein the downlink assignment indicates a resource of the set of one or more resources for the uplink channel, and a physical uplink control channel; and receive, by the base station from the user device, a signal via the indicated resource for the uplink channel, prior to the short physical uplink control channel of the slot.

Figure 9:
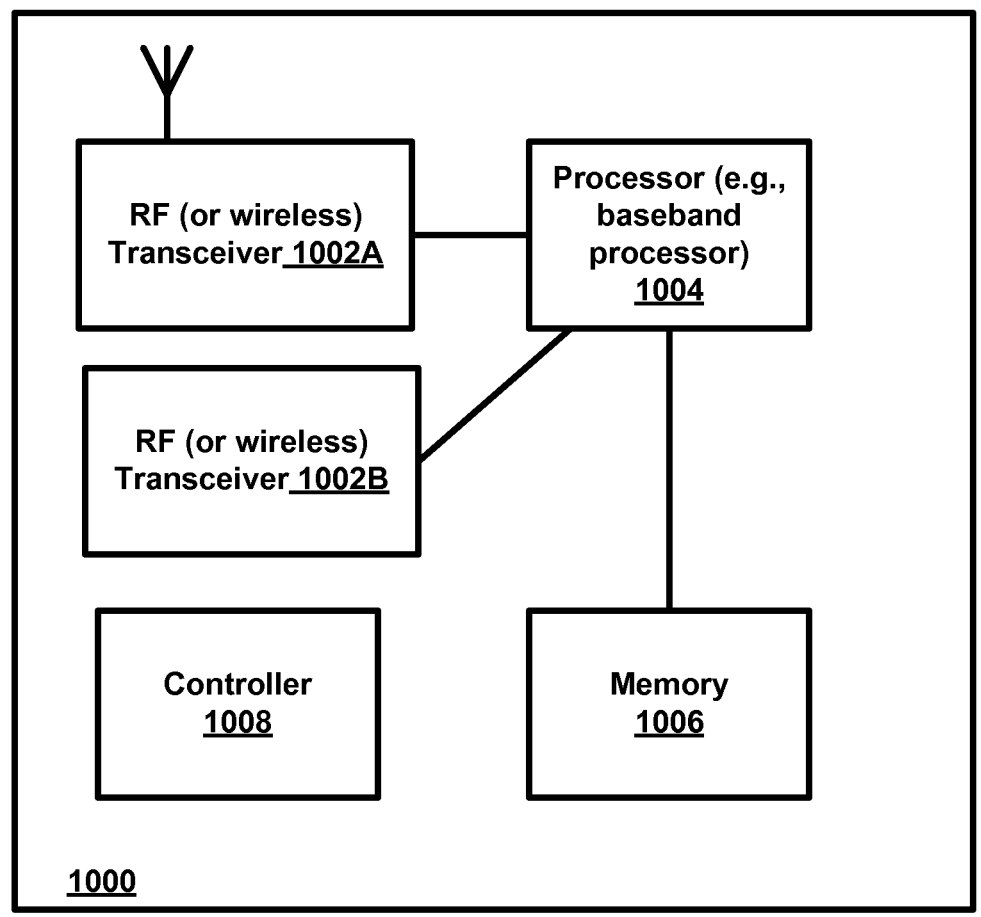
FIG. 9 is a block diagram of a node or wireless station (e.g., base station/access point or mobile station/user device) according to an example implementation.

FIG. 9 is a block diagram of a wireless station (e.g., AP, BS, eNB, UE or user device) 1000 according to an example implementation. The wireless station 1000 may include, for example, one or two RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 9, a controller (or processor) 1008 may execute software and instructions, and may provide overall control for the station 1000, and may provide control for other systems not shown in FIG. 9 such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example implementation, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

HARQ Hybrid Automatic Repeat request
(CA)ZAC (Constant Amplitude) Zero AutoCorrelation
ACK Acknowledgement
BW Bandwidth
gNB NR/5G Node B
CM Cubic metric
CP Cyclic Prefix
CS Cyclic Shift
CSI Channel state information
DCI Downlink Control Information
DFT-S-OFDM Discrete Fourier Transform Spread OFDM
DL Downlink
eMBB Enhanced Mobile Broadband
GP Guard Period
LTE Long Term Evolution
NR New Radio (5G)
OCC Orthogonal Cover Code
OFDM Orthogonal Frequency Division Multiplexing
PAPR Peak-to-average power ratio
PDCCH Physical Downlink Control Channel
PDSCH Physical Downlink Shared Channel
PRB Physical Resource Block
PUCCH Physical Uplink Control Channel
PUSCH Physical Uplink Shared Channel
QPSK Quadrature Phase Shift Keying
RF Radio Frequency
RS Reference Signal
SR Scheduling Request
SRS Sounding Reference Signal TDD Time Division Duplexing
TDM Time Division Multiplexing
UCI Uplink Control Information
UE User Equipment
UL Uplink
URLLC Ultra-Reliable and Low-Latency Communications

What is claimed is:

1. An apparatus comprising at least one processor and at least one memory including computer instructions that, when executed by the at least one processor, cause the apparatus to:
   receive, by a user device, a configuration of a set of one or more resources for an uplink channel to be used for transmission by the user device in a slot prior to a short physical uplink control channel of the slot;
   receive, by the user device, a downlink control information including a downlink assignment for a downlink channel;
   identify, by the user device based on the downlink assignment, a resource of the set of one or more resources for the uplink channel, and a physical uplink control channel;
   reserve, by the user device, the uplink channel by preventing a gap in transmission by the user device that is greater than a threshold; and
   transmit, by the user device, a signal via the identified resource for the uplink channel, prior to the short physical uplink control channel of the slot.

2. The apparatus of claim 1, wherein the apparatus being caused to identify, by the user device, based on the downlink assignment, the resource of the set of one or more resources for the uplink channel, and a physical uplink control channel, comprises the apparatus being caused to:
   receive, by the user device, an acknowledgement/negative acknowledgement (ACK/NACK) resource indicator (ARI) value that identifies both: 1) a short physical uplink control channel resource, of a plurality of short physical uplink control channel resources, for transmission of a hybrid automatic repeat request (HARQ) ACK/NACK feedback, and 2) a resource of the set of one or more resources for the uplink channel.

3. The apparatus of claim 2 wherein the ACK/NACK resource indicator (ARI) value is one ARI value of a plurality of ARI values, wherein each ARI value of the plurality of ARI values identifies, or is associated with, a different or associated: 1) a short physical uplink control channel (short PUCCH) resource, of a plurality of short physical uplink control channel resources, for transmission of the HARQ ACK/NACK feedback, and 2) a resource of the set of one or more resources for the uplink channel.

4. The apparatus of claim 1, wherein the apparatus being caused to receive, by a user device, the configuration of the set of one or more resources for an uplink channel comprises the apparatus being caused to:
   receive, by a user device, a configuration of a set of one or more resources for an uplink channel, wherein the uplink channel includes one or more of a physical uplink shared channel (PUSCH) and a long physical uplink control channel (long PUCCH).

5. The apparatus of claim 1, wherein the apparatus being caused to receive, by a user device, a configuration of a set of resources for an uplink channel comprises the apparatus being caused to:
   receive, by a user device, a configuration of a set of one or more resources for an uplink channel, the configuration including one or more of the following for one or more resources:
   an identification of the resource;
   a modulation rate and coding scheme (MCS) to be used for transmission via the resource;
   a channel format;
   a starting symbol;
   a duration;
   a frequency hopping configuration; and
   a demodulation reference signal cyclic shift.

6. The apparatus of claim 1, wherein the apparatus being caused to transmit comprises the apparatus being caused to:
   determine, by the user device, that the signal should be transmitted via the identified resource of the uplink channel in the slot prior to the short physical uplink control channel of the slot; and
   transmit, by the user device, a signal via the identified resource of the uplink channel, before the short physical uplink control channel resource of the slot.

7. The apparatus of claim 1, wherein the apparatus is further caused to:
   receive, by the user device, at least some data based on the downlink assignment for the downlink channel; and
   transmit, by the user device, a HARQ ACK/NACK feedback via an identified short physical uplink control channel resource.

8. The apparatus of claim 1, wherein the slot includes a transmission by the user device of a HARQ ACK/NACK feedback with respect to downlink data received, or attempted to be received, by the user device within the same slot.

9. The apparatus of claim 1, wherein the slot includes a transmission by the user device of a HARQ ACK/NACK feedback with respect to downlink data received, or attempted to be received, by the user device within the same slot and one or more preceding slots in a burst of contiguous downlink transmission.

10. The apparatus of claim 1, wherein the slot comprises the downlink control information, downlink data received by the user device via a shortened downlink data channel that frees up resources to be used for uplink transmission via the uplink channel, an uplink signal transmitted via the identified resource of the uplink channel prior to the short physical uplink control channel, and a HARQ ACK/NACK feedback with respect to the downlink data of the slot.

11. The apparatus of claim 1, wherein the apparatus being caused to transmit, by the user device, a signal via the identified resource of the uplink channel comprises the apparatus being caused to:
   transmit, by the user device, a signal via the identified resource of the uplink channel, including uplink data and at least one of a HARQ process identifier and a new data indicator associated with the uplink data.

12. The apparatus of claim 11, wherein the HARQ process identifier is associated with a ACK/NACK resource indicator (ARI) value.

13. The apparatus of claim 11, wherein the HARQ process identifier is selected based on a slot number for the slot.

14. The apparatus of claim 1, wherein the apparatus being caused to transmit, by the user device, a signal via the identified resource of the uplink channel comprises the apparatus being caused to:
   determine, by the user device, that uplink transmission via the identified resource of the uplink channel is scheduled to begin less than a threshold time period after end of receipt of a downlink data that is received within the slot based on the downlink assignment for a downlink channel; and transmit, by the user device, without performing a listen-before-talk of the uplink channel, a signal via the identified resource of the uplink channel, prior to the physical uplink control channel of a self-contained slot.

15. The apparatus of claim 1, wherein the apparatus being caused to transmit, by the user device, a signal via the identified resource of the uplink channel comprises the apparatus being caused to:

determine, by the user device, that uplink transmission via the identified resource of the uplink channel is scheduled to begin greater than or equal to a threshold time period after end of receipt of a downlink data that is received within the slot based on the downlink assignment for the downlink channel;

perform a listen-before-talk of the uplink channel to confirm that the channel is available; and transmit, by the user device, a signal via the identified resource of the uplink channel, prior to the physical uplink control channel of a self-contained slot.

16. The apparatus of claim 1, wherein the apparatus being caused to transmit, by the user device, a signal via the identified resource of the uplink channel comprises the apparatus being caused to perform at least one of the following:

transmit physical uplink shared channel (PUSCH) data via a PUSCH channel;

transmit uplink control information via a long physical uplink control channel (long PUCCH); or transmit at least one of reference signals and channel state information via the long PUCCH channel.

17. An apparatus comprising at least one processor and at least one memory including computer instructions that, when executed by the at least one processor, cause the apparatus to:

transmit, by a base station, a configuration of a set of one or more resources for an uplink channel to be used for transmission by a user device in a slot prior to a short physical uplink control channel of the slot;

transmit, by the base station to the user device, a downlink control information including a downlink assignment for a downlink channel, wherein the downlink assignment indicates a resource of the set of one or more resources for the uplink channel, and a physical uplink control channel; and receive, by the base station from the user device, a signal via the indicated resource for the uplink channel and at least one of a HARQ process identifier associated with a ACK/NACK resource indicator (ARI) value and a new data indicator associated with the uplink data, prior to the short physical uplink control channel of the slot.

18. The apparatus of claim 17, wherein the downlink assignment comprises:

an ACK/NACK resource indicator (ARI) value that identifies both: 1) a short physical uplink control channel resource, of a plurality of short physical uplink control channel resources, for transmission of a HARQ ACK/NACK feedback, and 2) a resource of the set of one or more resources for the uplink channel.

19. The apparatus of claim 17, wherein the apparatus being caused to transmit, by a base station, a configuration of a set of one or more resources for an uplink channel comprises the apparatus being caused to:

transmit, by the base station, a configuration of a set of one or more resources for an uplink channel, wherein the uplink channel includes one or more of a physical uplink shared channel (PUSCH) and a long physical uplink control channel (long PUCCH).

20. The apparatus of claim 17, wherein the apparatus being caused to transmit, by a base station, a configuration of a set of one or more resources for an uplink channel comprises the apparatus being caused to:

transmit, by the base station, a configuration of a set of one or more resources for an uplink channel, the configuration including one or more of the following for one or more resources:

an identification of the resource;

a modulation rate and coding scheme (MCS) to be used for transmission via the resource;

a channel format;

a starting symbol;

a duration;

a frequency hopping configuration; or a demodulation reference signal cyclic shift.

21. The apparatus of claim 17, wherein the slot comprises the downlink control information, downlink data transmitted by the base station via a shortened downlink data channel that frees up resources to be used for uplink transmission via the uplink channel by the user device, an uplink signal received by the base station via the indicated resource of the uplink channel prior to the short physical uplink control channel, and a HARQ ACK/NACK feedback with respect to the downlink data of the slot.

* * * * *